United States Patent
Halstead, Jr. et al.

(10) Patent No.: US 7,373,639 B2
(45) Date of Patent: *May 13, 2008

(54) SYSTEM AND METHOD SUPPORTING TYPE CHECKING OF OPTIONS

(75) Inventors: Robert H. Halstead, Jr., Belmont, MA (US); David A. Kranz, Arlington, MA (US); Christopher J. Terman, Newton Center, MA (US); Stephen A. Ward, Watertown, MA (US)

(73) Assignee: Sumisho Computer Systems Corporation, Tokyo (JP)

( * ) Notice: Subject to any disclaimer, the term of this patent is extended or adjusted under 35 U.S.C. 154(b) by 266 days.

This patent is subject to a terminal disclaimer.

(21) Appl. No.: 09/759,697

(22) Filed: Jan. 12, 2001

(65) Prior Publication Data

US 2002/0100033 A1 Jul. 25, 2002

Related U.S. Application Data

(63) Continuation-in-part of application No. 09/672,848, filed on Sep. 28, 2000, now abandoned.

(60) Provisional application No. 60/162,825, filed on Nov. 1, 1999.

(51) Int. Cl.
*G06F 9/45* (2006.01)
(52) U.S. Cl. .................................. 717/140
(58) Field of Classification Search ........ 717/140–149, 717/116; 719/316; 707/103 R, 4
See application file for complete search history.

(56) References Cited

U.S. PATENT DOCUMENTS

| | | | |
|---|---|---|---|
| 5,093,914 | A | 3/1992 | Coplien et al. |
| 5,652,879 | A | 7/1997 | Harris et al. |
| 5,706,505 | A | 1/1998 | Fraley et al. |

(Continued)

FOREIGN PATENT DOCUMENTS

EP 0 725 337 A1 8/1996

OTHER PUBLICATIONS

"FAQ's, GUI Toolkit", Curl Corporation Web Site (http://www.curl.com/developers/faq_gui.php? ), 1998-2003.*

(Continued)

*Primary Examiner*—Mary Steelman
(74) *Attorney, Agent, or Firm*—Finnegan, Henderson, Farabow, Garrett & Dunner LLP

(57) ABSTRACT

To support values of properties, a class includes fields to support values in preallocated memory space and with an option data structure which supports, in instances of the class, references to option values without preallocation of memory space. The field and option values are accessed in an instance object of the class using expressions of the same syntactic form. During compilation, the compiler checks the type of an option value against a type description within the option data structure. Different classes may support different forms of data structures such as a linked list or a hash table. During compilation, a method call to an object is encoded without regard to the form of the option data structure. An option value may be set in an option data structure from an initialization expression which includes the name of the option value and, as an argument, the option value.

34 Claims, 25 Drawing Sheets

U.S. PATENT DOCUMENTS

| | | | |
|---|---|---|---|
| 5,732,271 | A | 3/1998 | Berry et al. |
| 5,740,440 | A | 4/1998 | West |
| 5,790,857 | A | 8/1998 | Clifford et al. ............. 395/703 |
| 5,911,076 | A | 6/1999 | Acker et al. |
| 5,915,253 | A | 6/1999 | Christiansen ............... 707/103 |
| 5,924,098 | A | 7/1999 | Kluge ......................... 707/100 |
| 5,943,496 | A | 8/1999 | Li et al. |
| 5,960,197 | A | 9/1999 | Segnan |
| 5,999,948 | A * | 12/1999 | Nelson et al. .............. 715/506 |
| 6,045,585 | A | 4/2000 | Blainey |
| 6,047,284 | A * | 4/2000 | Owens et al. ................... 707/4 |
| 6,119,157 | A * | 9/2000 | Traversat et al. ........... 709/220 |
| 6,199,157 | B1 | 3/2001 | Dov et al. |
| 6,223,342 | B1 * | 4/2001 | George ....................... 717/116 |
| 6,305,012 | B1 * | 10/2001 | Beadle et al. ............... 717/148 |
| 6,356,279 | B1 | 3/2002 | Halstead, Jr. et al. |
| 6,487,713 | B1 * | 11/2002 | Cohen et al. ............... 717/105 |
| 6,510,352 | B1 * | 1/2003 | Badavas et al. .............. 700/19 |
| 6,842,906 | B1 * | 1/2005 | Bowman-Amuah ......... 719/330 |
| 6,889,373 | B2 * | 5/2005 | Fukase et al. ............... 717/106 |
| 2001/0005886 | A1 * | 6/2001 | Stratton et al. ............. 713/166 |

OTHER PUBLICATIONS

Gamma, E; Helm, R; Johnson, R, Vlissides, John;, "Design Pattern, Elements of Reusable Object Oriented Software", Addison-Wesley 1995, ISBN 0-201-63361-2, p. 87. (as incorporated by the Nelson patent reference).*

Myers, B.A., et al., "Declarative Programming in a Prototype-Instance System: Object-Oriented Programming Without Writing Methods," *ACM SIGPLAN Notices 27*(10): 184-200 (1992).

Hostetter, M. et al., "Curl—A Gentle Slope Language for the Web," *World Wide Web Journal*, vol. II, Issue 2, Spring 1997 (http://www.w3journal.com/6/) 14 pp.

World Wide Web Journal, "Curl, A Gentle Slope Language for the Web" <http://www.w3journal.com/6/s3.kranz.html> (accessed Jan. 12, 2004).

Aho, Alfred V., et al., "Run-Time Environments," *Compilers—Principles, Techniques, and Tools*, Chapter 7 (MA: Addison Wesley Longman), pp. 389-455 (1998).

McLennan, Michael J., "Object-Oriented Programming with [incr Tcl] Building Mega-Widgets with [incr Tk]" < http://www.ing.iac.es/~docs/external/tcl/itcl/tutorials/itcltk-a4.pdf> accessed Jan. 12, 2004.

Deitel, H. M. et al., "Object Based Programming," *Java—How to Program*, Second Edition, pp. 308-349 (1998).

Muchnick, Steven S., "Symbol-Table Structure," *Advanced Compiler Design and Implementation*, pp. 43-65 (1997).

Bjarne Stroustrup, "An Overfiew of C++", 1986, SIGPLAN Notices, vol. 21, No. 10.

Mark L. Ulferts, "[incr Widgets]: An Object Oriented Mega-Widget Set," 1995, Proceedings of the Third Annual Tcl/Tk Workshop.

TK Library Procedures, "TK-Configure Widget Manual Page," <http://www.tcl.tk/man/tcl8.2.3/TkLib/ConfigWidg.htm> (accessed Jan. 12, 2004).

Archetype Base Class for [incr Tk], "itk:: Archetype" <http://incrtcl.sourceforge.net/itk/Archetype.html> (accessed Jan. 12, 2004).

Curl Corporation, "Welcome to Curl Corporation" <http://www.curl.com> (retrieved Jan. 11, 2004 from http://web.archive.org) (last updated Feb. 29, 2000 according to http://web.archive.org).

Archetype, "Archetype—base class for all [incr Tk] mega-widgets," [online] Nov. 16, 1999, [retrieved Aug. 19, 2004]. Retrieved from the Intenet <URL:http://sourceforge.net/project/showfiles.php?group_id=13244.

SourceForge® net, "Project: [incr Tcl]: File List," [online], 2004, [retrieved Aug. 19, 2004]. Retrieved from the Internet <URL: http://sourceforge.net/project/showfiles.php?group_id=13244.

SourceForge® net, "Project: Tcl: File List," [online], 2004, [retrieved Aug. 18, 2004]. Retrieved from the Internet <URL: http://sourceforge.net/project/showfiles.php?group_id=10894.

Tk Library Procedures—Tk_Configure Widget manual page, [online], 1990-1997, [retrieved Jul. 9, 2004]. Retrieved from the Internet<URL:http://www.tcl.tk/mantc18.0/TkLib/ConfigWidg.htm.

www.cs.appstate.edu, Index of . . . examples, "Bag Implementation Using Linked Lists," 1998, 11 pages.

Main et al., "Data Structures and Other Objects Using C++," 1997, 3 pages.

www2.ncsu.edu, "Texts in Use by Instructors in O-O," 1997, pp. 1-4.

IBM Technical Disclosure Bulletin, "Fast Method for Enabling Secondary Inheritance" v. 36, No. 9B, pp. 231-232 (Sep. 1993).

* cited by examiner

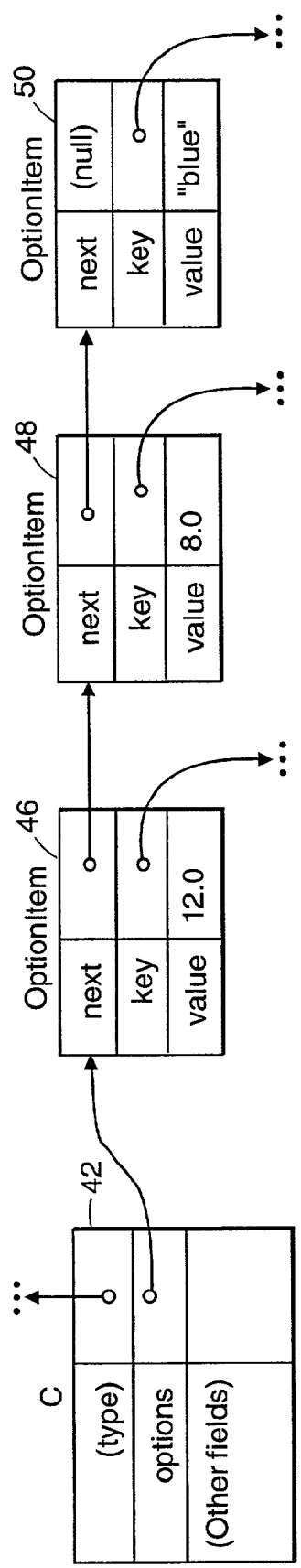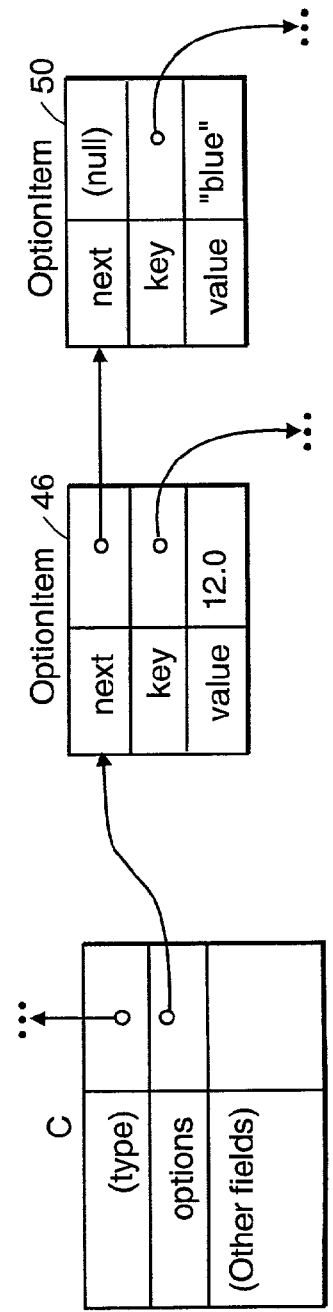
FIG. 2D
FIG. 2E

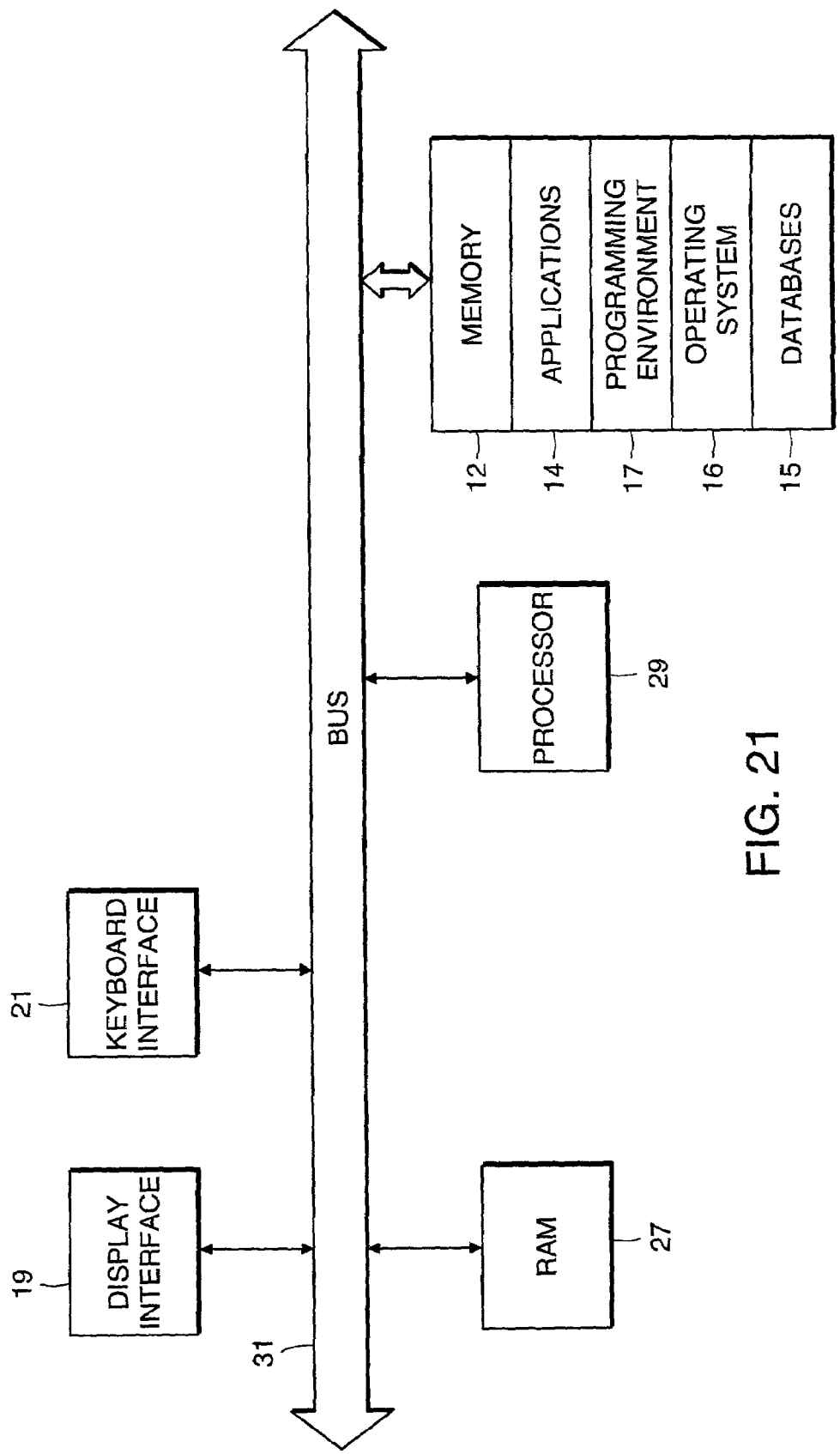

SYSTEM AND METHOD SUPPORTING TYPE CHECKING OF OPTIONS

RELATED APPLICATION(S)

This application is a Continuation-in-Part of U.S. application Ser. No. 09/672,848, filed Sep. 28, 2000, now abandoned, which claims priority to U.S. Provisional Application No. 60/162,825, filed Nov. 1, 1999, the entire teachings of which are incorporated herein by reference.

BACKGROUND OF THE INVENTION

In typical data processing systems, a compiler reads source code and creates the object code which is ultimately processed. Typically, the compiler creates a data structure which will support property values which are defined later in the source code or during run time. In an object oriented system, the compiler may create a class and a mechanism for creating instances of that class with defined fields of preallocated memory space into which the values are stored.

An alternative data structure which has, for example, been supported in the [incr Tk] language allows values to be stored in strings or arrays as options associated with an instance object.

SUMMARY OF THE INVENTION

In a data processing system, a class supports an option data structure having, in instances of the class, references to option values without preallocation of memory space for the full option values. The option data structure includes a type description of the option value. During compilation, the type description in the option data structure is used to process an operation. For example, the declared type of a value to be set may be checked against that in the option data structure when the compiler processes a set operation. Also, the legality of an operation to be performed on a value obtained in a get operation may be checked based on the type description.

The option data structure may comprise a linked list of option items having option values. A nonlocal option value may apply to other objects in a nonlocal option hierarchy such as a graphical hierarchy.

The option data structure may additionally identify change handler code that is executed when an option value changes. Change handler code for one option may be defined in different classes within a class inheritance hierarchy, and change handler code from each class is executed when the option value changes.

A change handler may be identified by an option binding which may be located by first searching a mapping data structure for a previously computed mapping to the option binding. If no mapping was previously computed, the mapping to the option binding is computed and stored in the mapping data structure.

The option data structure may include a default value. In a get operation to an instance of the class, if an option value which applies to the instance has been set, the set option value may be obtained. If no value which applies has been set, the default value for the class is obtained.

Different classes may support option data structures of different forms. During compilation, an option operation, such as a get, set or is set? operation on an option value, is encoded as a method call to an object without regard to the form of the option data structure supported by the class. The ultimate form of the data structure is dependent on the called object.

The class supporting the option data structure may additionally include defined fields to support values in preallocated memory space.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2B-2F illustrate an instance of a class type having different option item data structures.

FIG. 21 illustrates details of the computer of FIG. 20.

DETAILED DESCRIPTION OF THE INVENTION

A description of preferred embodiments of the invention follows.

The preferred embodiment of the invention is presented with respect to the Curl™ language developed by Curl Corporation of Cambridge, Massachusetts. The Curl™ programming language is based upon a language developed at Massachusetts Institute of Technology and presented in "Curl: A Gentle Slope Language for the Web," WorldWideWeb Journal, by M. Hostetter et al., Vol II. Issue 2, O'Reilly & Associates, Spring 1997.

Like many object-oriented languages (such as Java), the Curl language has the capability to define "classes" that have "fields." Within those fields, values of various properties of a class instance may be defined. For example, for a rectangle, parameters of location, dimensions, color, font and so forth may be defined.

If a class C has a field x, and an instance c of the class C is created by an expression such as let c:C={C} it is then possible to read the value of c's field x using the expression c.x and it is possible to set the value of c's field x using the statement set c.x=new-value Moreover, the compiler knows the type of the expression c.x based on the declared type of the field x. The compiler also can check that the new-value in set c.x=new-value is of a suitable type to be stored into the field x, and can issue an error message if this is not the case.

For each field that is defined for a class C, each instance of C will have some space set aside to store the value of that field.

Unlike other object-oriented languages, the Curl language has a mechanism known as "options" that works like fields but offers a different space/time tradeoff. An example is presented in FIG. 1. Consider an instance 20 of a class which has several properties which must be defined for that instance. A field might be provided in the instance for each property and a value for that property provided in its associated field. Where no value is provided, a default for the class would be used. However, where the use of defaults is the norm, providing a field for each property wastes memory space. In accordance with the present invention, fields may be provided for only those properties which are likely not to use the default. For example, values of property one and property 10 are included in fields of the instance 20. To allow for definition of other properties, the embodiment of FIG. 1 includes an options pointer to a linked list 22. Only those properties which do not have fields in the instance and which do not rely on the default value are included in that linked list. To determine a particular property (option) value, the system searches the linked list for the desired property, and if the property is not included in the list, relies on the default. The search of the linked list is more time-consuming than directly accessing a value from a field, but there is a substantial savings in memory space where the number of properties which do not rely on the default value is small.

Figure 1:
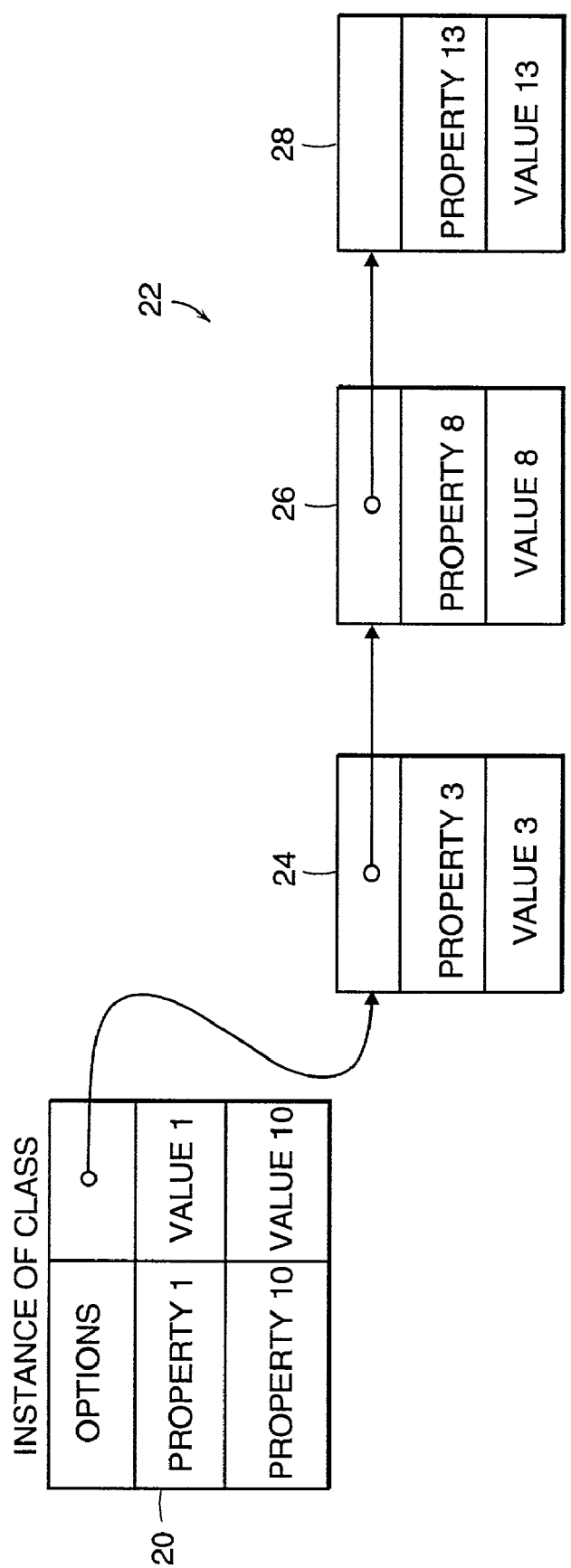
FIG. 1 illustrates the use of an option list to define properties in accordance with the present invention.

In the example of FIG. 1, any code which requires either property 1 or property 10 directly accesses the value 1 or value 10 from the associated field in the instance 20. If, for example, property 8 is required, the system does not find that property in a field, and the system follows the option pointer to option item 24. The desired property 8 is compared against the key property 3 in option item 24 and when no match is found, the pointer to the next option item 26 is followed. Here the desired property matches the key of option item 26 and the value of property 8 stored in the option item is returned. The system need not search further to the final option item 28. If property 7 were required, the system would search the option list, and not finding a match to any of the keys of the option items, would return the class default for property 7.

As will be seen, the same syntax is used to read or change values regardless of whether the value is stored in the field or an option list. The compiler is able to respond appropriately in either case and provide the appropriate type checking.

There are two kinds of options: local and nonlocal. Local options are discussed immediately below. Nonlocal options provide a mechanism for propagating values from object to object and are discussed later.

Local Options

If a class C of the Curl language has a local option called y, the option's value can be accessed using the same expression syntax c.y that can be used for fields. The option's value can also be set using the same syntax that works for fields:

set c.y=new-value

However, each option has a "default value" that is the initial value of that option when an instance of the class is created. If a class C has one or more options, then each instance of C contains an "option list" field that points to a (possibly empty) linked list of "option items," each containing an "option key" and a value. If c is an instance of C and the expression c.y is evaluated, c's option list is searched to see whether it contains an option item whose option key corresponds to y. If so, the associated value is returned. If not, the default value of the option y is returned.

When the statement set c.y=new-value is executed, the result depends on whether c already has an option item corresponding to y. If so, the value in that option item can be replaced with new-value. (Alternatively, the existing option item can be discarded and a new option item created.) If there is not a previously existing option item corresponding to y, an option item corresponding to y is created, new-value is put into it, and the option item is added to the option list of c.

The option mechanism also supports two other operations:

unset c.y removes from c the option item, if any, that corresponds to y. This has the effect of restoring c.y to its default value.

{is-set? c.y} returns true or false according to whether a binding for y currently exists on c's option list. This operation is needed in situations where it is necessary to distinguish the case where the option y has not been set (or has subsequently been unset) from the case where the option y has been set to a value that equals its default value.

The use of option lists makes it possible to define a very large set of possible options for a class without requiring the size of each instance of the class to be proportional to the number of possible options. The size of each instance is only proportional to the number of options that have been set on that instance.

Change Handlers

Every option declaration can define a "change handler," which is some code that is executed whenever the option's value changes. Thus, the most general way to declare a local option is as follows:

```
{local-option <name>:<type>=<default value>
   <change handler>}
```

The following is a concrete example:

```
{define-class Graphic {inherits OptionList}
   {local-option border-width:float=0.0
      {self.border-width-changed border-width}}
   ...}
```

In this example, border-width is a local option of the class Graphic. The permissible values of this option are of type "float" and the default value is 0.0. Whenever there is a change (including a transition between set and unset) in the value of the border-width option for some instance g of Graphic, that instance's border-width-changed method is invoked with the new border-width value as the argument.

If the change handler has been invoked because the option was unset, then the value supplied will be the option's default value. If the program needs to distinguish between the option's becoming unset and its becoming set to its default value, the change handler can use the is-set? operation to determine which is the case.

The change handler mechanism is integrated with class inheritance: if Rectangle is a subclass of Graphic, the definitions of both the Rectangle and Graphic classes can include option declarations for the same option, specifying different change handlers:

```
{define-class Graphic {inherits OptionList}
   {local-option border-width:float=0.0
      {self.border-width-changed border-width}}
   ...}
{define-class Rectangle {inherits Graphic}
   {local-option border-width:float
      {self.rectangle-border-processing border-width}}
   ...}
```

In this situation, if the border-width option of an instance of Rectangle is set, both change handlers will be invoked. This allows a subclass to extend the change handling that is performed by its base class. Note also that the default value need not be repeated in the subclass's option declaration.

Implementation of Options

The Curl compiler processes the option declaration and therefore knows which option names are valid for any given class, and also knows the declared type for each such option name. Accordingly (and significantly), it can perform type checking on uses of options in exactly the same way as it can type-check uses of fields. Assuming that the type check reveals no problems, the compiler generates code for each of the fundamental option constructs by translating them as follows:

| | |
|---|---|
| c.x | becomes {c.get-option <x>} |
| set c.x = 17 | becomes {c.add-option <x> 17} |
| unset c.x | becomes {c.remove-option <x>} |
| {is-set? c.x} | becomes {c.option-set? <x>} |

The notation <x> represents an "option binding" generated by the compiler that serves as a key for option storage and lookup. Each class that contains an option declaration for x has an associated option binding for x. When the compiler compiles a reference such as c.x, where c is an instance of a class C, the compiler locates the most specific option binding for x that is in the class C or one of its superclasses. The lookup algorithm used for this process is exactly the same as is used when compiling references to fields. Thus, if C itself contains a declaration of the option x, the binding associated with that declaration is used. If not, then if C's base class D has such a declaration, D's binding is used. If not, the algorithm proceeds in the same fashion until a declaration of x is located. The term "most specific option binding" is used for the result: this computation is said to return the most specific option binding of x in C.

In cases such as the Rectangle/Graphic example above, where declarations of the same option occur at multiple levels of the class hierarchy, the associated option bindings are linked together. The option binding corresponding to Rectangle.border-width contains a "superclass binding pointer" that points to the option binding corresponding to Graphic.border-width. Each option binding also contains a "base class binding pointer" that points directly to the end of the chain of superclass binding pointers, providing a quick way to reach the option binding corresponding to the given option name that lies closest to the root of the class hierarchy. This "base class option binding" has a special role in the option implementation. One aspect of this role is that the default value of the option is always stored in this binding. Other aspects are discussed later.

Each of the methods get-option, add-option, remove-option, and option-set? is a method of the abstract class OptionCache. All classes that contain option declarations inherit, directly or indirectly, from OptionCache:

```
{define-class abstract public OptionCache
   {method public abstract {get-option key:OptionBinding}:any}
   {method public abstract {add-option key:OptionBinding, value:any}:void}
   {method public abstract {remove-option key:OptionBinding}:void}
   {method public abstract {option-set? key:OptionBinding}:bool}
}
```

The Curl language has a concrete class OptionList which is a subclass of OptionCache and which provides the linked list of option items described above:

```
{define-class public OptionList {inherits OptionCache}
   field options:OptionItem
   Implementations of get-option, add-option, remove-option, and option-
     set?
}
```

Thus, it is OptionList that actually contains the "options" field that points to the linked list of option items. The option key that is used in these option items is the base option binding. OptionList includes the code required to get and change options in the option list.

Suppose we then define the following subclasses:

```
{define-class public A {inherits OptionList}
   {local-option length:float=5.0
      {self.request-draw}
   }
   {local-option width:float=3.0
      {self.request-draw}
   }
   Other code
}
{define-class public B {inherits A}
   Code that does not involve the length or width options
}
{define-class public C {inherits B}
   {local-option length:float
      {self.tell-user length}
   }
   Other code
}
```

Figure 2A:
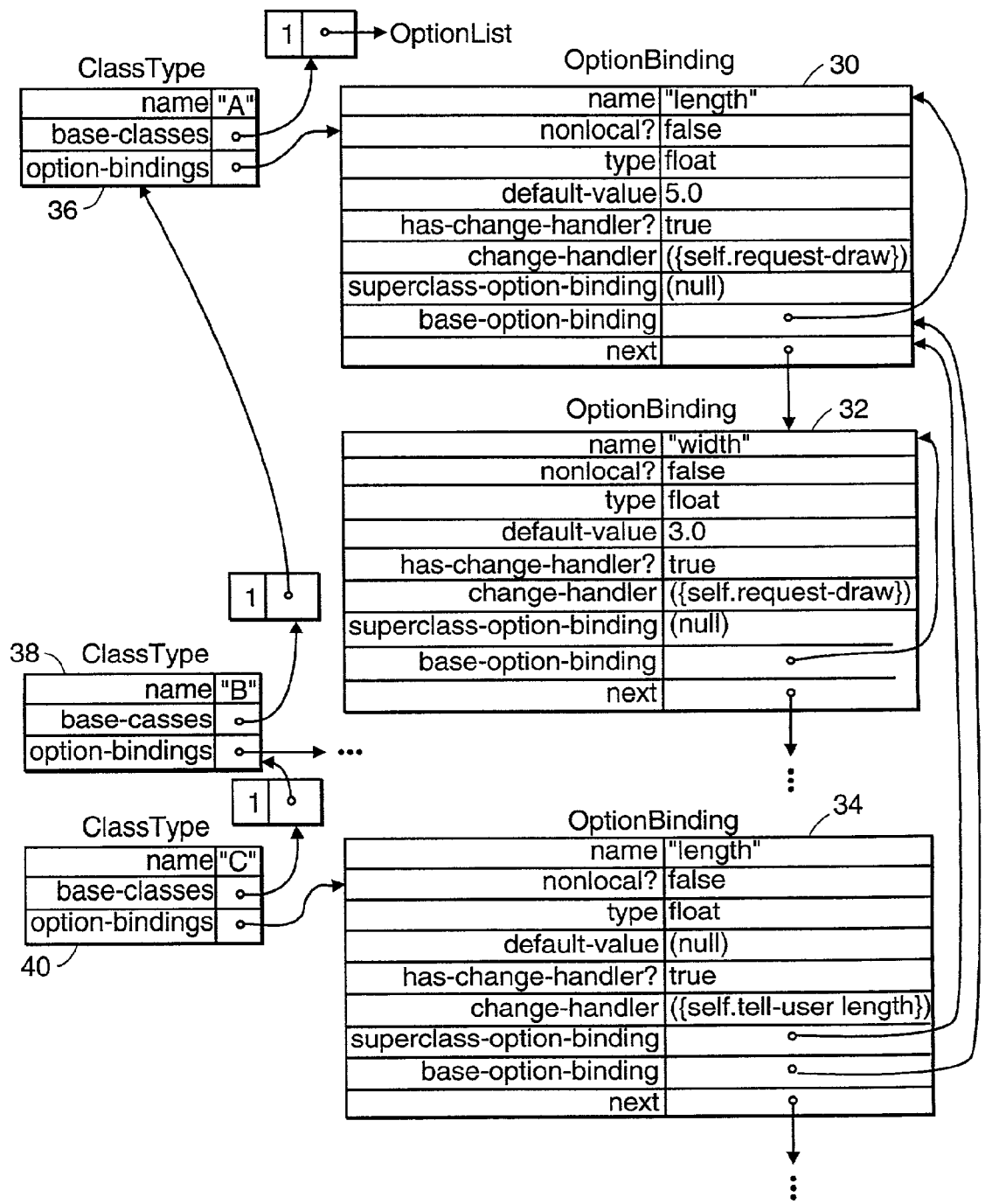
FIGS. 2A illustrates an example class hierarchy with option binding lists to illustrate the present invention.

When these definitions are compiled, the compiler generates an OptionBinding object corresponding to each local-option declaration in the program as illustrated at 30, 32 and 34 of FIG. 2A. Each OptionBinding object has fields including the following:

name: the name of the option
  nonlocal?: true if the option is a nonlocal option
  type: the type of values to which the option can be set
  default-value: the default value of the option, or else null
  has-change-handler?: true if the option declaration included a change handler
  change-handler: a procedure containing the code for the change handler, if one was specified
  superclass-option-binding: the OptionBinding, if any, corresponding to the closest declaration of this option in a superclass
  base-option-binding: the OptionBinding that is reached by following the superclass-option-binding links repeatedly until the last OptionBinding in the chain is reached
  next: used to build a linked list of the OptionBindings that correspond to declarations in a particular class The compiler also generates an object 36, 38, 40 to describe each class (e.g., A, B, and C); each of these objects points to a list of all the OptionBinding objects corresponding to option declarations appearing in the definition of that class.

More specifically, class type object 36 for class A points to its base class OptionList. It also points to a linked list of its option bindings including bindings 30 and 32. Option binding 30 is for the property "length" and option binding 32 is for the property "width." The fields are filled in accordance with the class definitions presented above.

Class type B 38 references its base class A 36 from which it inherits, and also points to a linked list of option bindings. Those option bindings do not involve the length or width options and thus are not illustrated in this example.

Class type object C 40 inherits from and refers to its base class B and also points to an option binding linked list which includes an option binding for the property "length." In this case, superclass A has the only other declaration of length, so both the superclass-option-binding and base-option-binding pointers point to option binding 30 of superclass A.

Figure 2B:
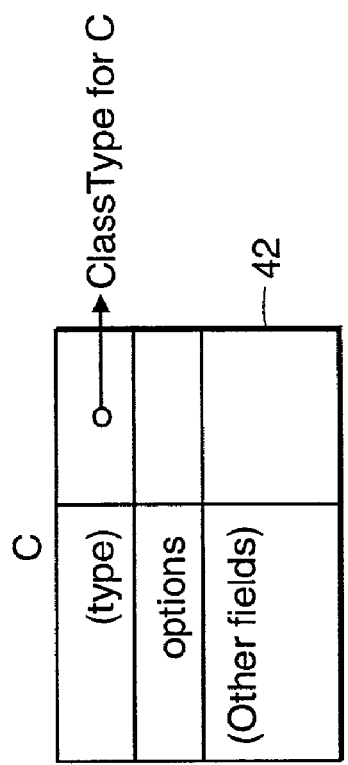

FIGS. 2B through 2E illustrate four possible instances of class C. In FIG. 2B, the instance object points to the class type 40 for class C in FIG. 2A. It may include values in other fields. In this case, the option pointer is null so the default values are used for all properties not included in fields. In particular, the length and width values are both taken as the defaults of option bindings 30 and 32 of the base class A.

Figure 2C:
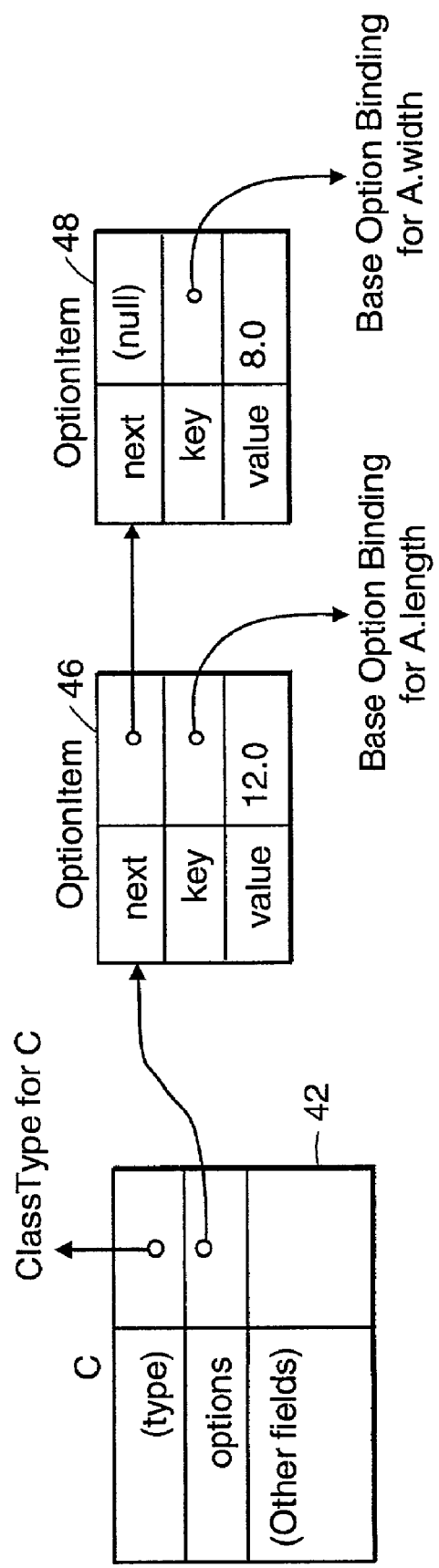

In the case of FIG. 2C, the length option of this instance is explicitly set to 12 and the width option is set to 8. The instance still points to the class type object 40 and additionally has a pointer to an option list including option items 46 and 48. Within that linked list, option item 46 includes as its key a pointer to the base option binding 30 for class A, "length," and the option item 46 also includes a value of 12. The option item 48 includes as its key a pointer to the base option binding 32 of FIG. 2A and a value 8.

If another option for the color blue were added, the linked list would be extended as illustrated in FIG. 2D. The key for option item 50 would point to a base option binding for color, not previously described, as well as the value blue.

Finally, if the width option were unset, the option item 48 would be removed from the linked list and the next pointer of option item 46 would be changed to point to option item 50 as illustrated in FIG. 2E.

When an option item is added to an option list, the compiler must determine the base option binding to be inserted as the key in the option item. To that end, the compiler first looks to the class objects and their option binding lists to determine the most specific option binding. For example, if the instance is of Type C, the compiler first looks to the option binding list of ClassType C object 40 for an option binding having an option name which matches that of the option item being created. For example, for a "length" option item such as OptionItem 46, option binding 34 is located. That option binding then provides the appropriate base option binding to be included as the key in the option item. If a matching binding were not found in the option binding list of class C, the option binding list of the class ancestors of class C would be searched for the most specific option binding. In the case of the "width" option, for example, the compiler would next look to the option binding list of class B 38 and, finding no match, would continue to the option binding list of class A 36. A match would be found at option binding 32, and since the base option binding field in that option binding points to option binding 32 itself, option binding 32 would be taken as both the most specific option binding and the base option binding and would be used as the key in the option item.

Figure 3A:
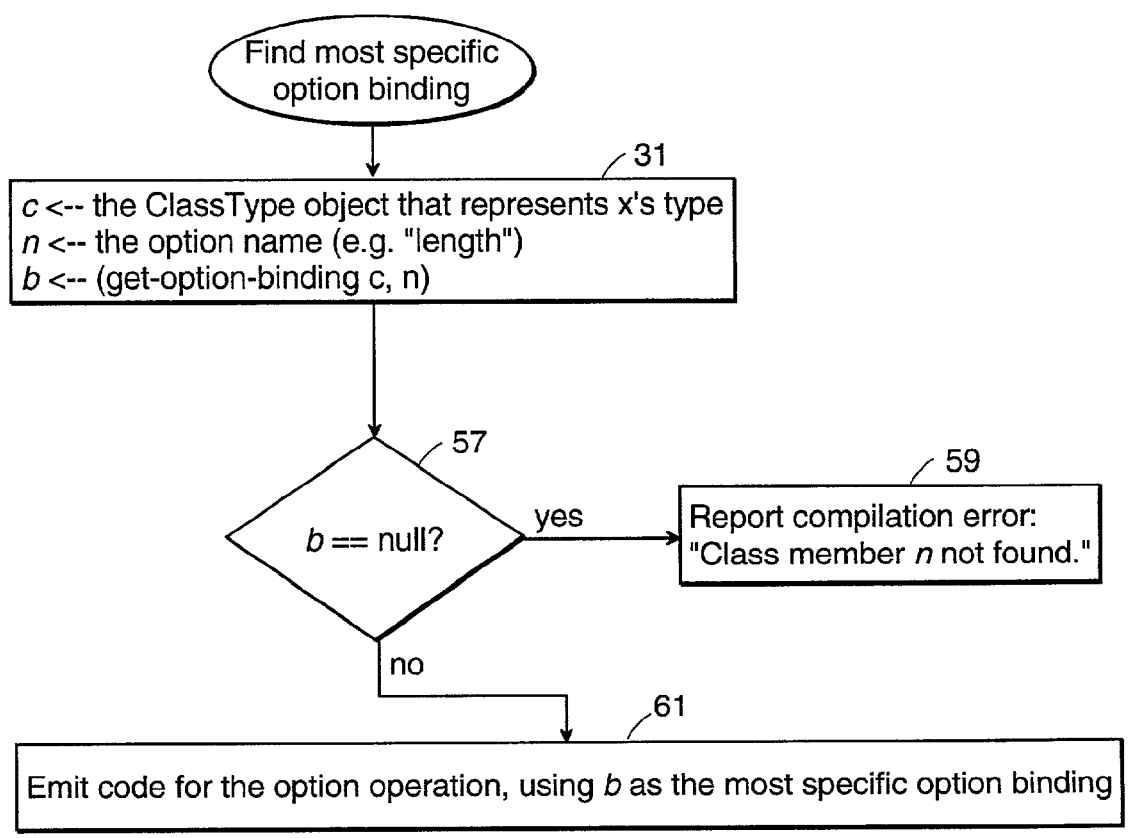
FIGS. 3A and 3B present flowcharts of the procedure for finding a most specific option binding for an option item.
Figure 3B:
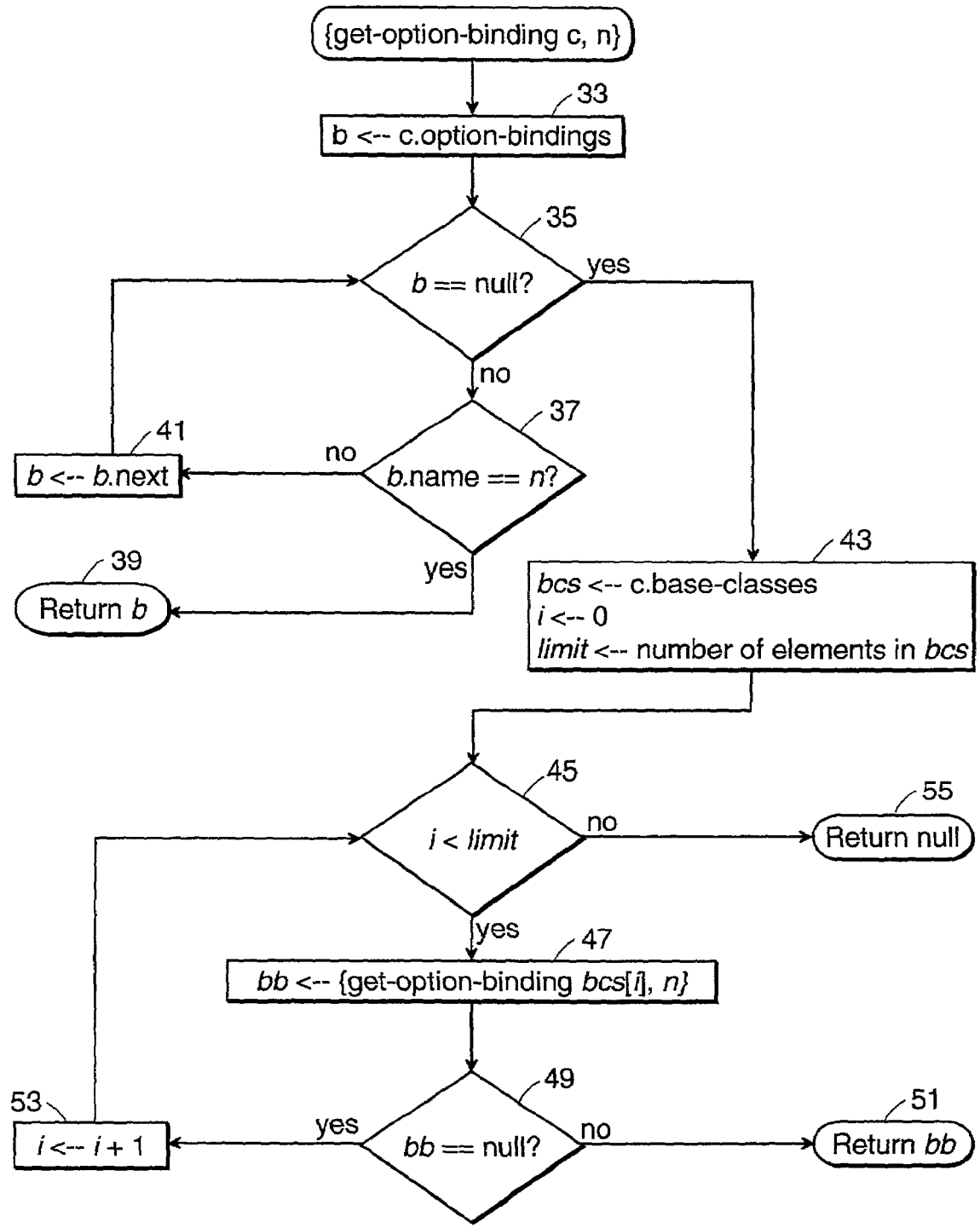

When the compiler compiles a reference to an option (e.g., x.length), it operates as in FIG. 3A, using the subroutine get-option-binding of FIG. 3B to find the most specific option binding b. At 31, c is defined as the class type object that represents x's type, n is the option name, such as length, for which the most specific option binding is being searched. At 31, the subroutine get-option-binding of FIG. 3B is called. This is a recursive routine which first searches through the option bindings list of the class c and then, if an option binding is not found, is called again to search base classes, that is, immediate parents of the class object. At 33, b is defined as the option bindings pointer of class c which points to the linked list of option bindings. For example, if the class type is object 40 of FIG. 2A, the option binding pointer is a pointer to option binding 34. At 35, if there is an options binding list, b is not null and the name of the first option binding is compared to the name being searched at 37. If the names match, the most specific option binding has been located and is returned, at 39, to 31 of FIG. 3A. If the names do not match at 37, b is changed at 41 to the next pointer value of the option binding considered. Thus, the system loops through 35, 37 and 41 until a match is found with the option name or the option binding list is completed.

Once the search of an option binding list is completed, the system defines the array bcs as an array of the base classes at 43. A base class is an immediate parent class. For example, class 38 is the base class of class 40. An index i is set to zero and a limit is set at the number of base classes in the array bcs. At 45, if it is determined that there is a base class, the get-option-binding subroutine of FIG. 3B is called for that base class. Thus, that parent option binding list is searched for a match with the option name. If there is no match, the system continues to that parent's base classes and so on. If no option binding is returned at 47, as determined at 49, the index i is incremented at 53 in order to call get-option-binding for another parent. Once all parents have been searched with no returned option binding, null is returned at 55 to 31. If the test at 49 shows that bb contains an option binding, then that option binding is returned to 31 at 51.

Once the get-option-binding routine is complete, either an option binding or null has been returned at 57. If null is returned, a compilation error "Class member n not found" is returned at 59. If an option binding was located, code for the requested option operation is emitted using the returned option binding as the most specific option binding at 61.

When a program contains an operation to get a local option value (e.g., x.length), the compiler translates that operation to a method call {x.get-option b} where b is the most specific OptionBinding for the length option for the ClassType object that represents the type of x. For example, in the case of an instance of class type C 40, b for the length option would be option binding 34. On the other hand, b for the width option would be option binding 32 of ClassType A. The get-option-binding routine of FIG. 3B would return the most specific option binding 32 for width by searching the class hierarchy.

Figure 4:
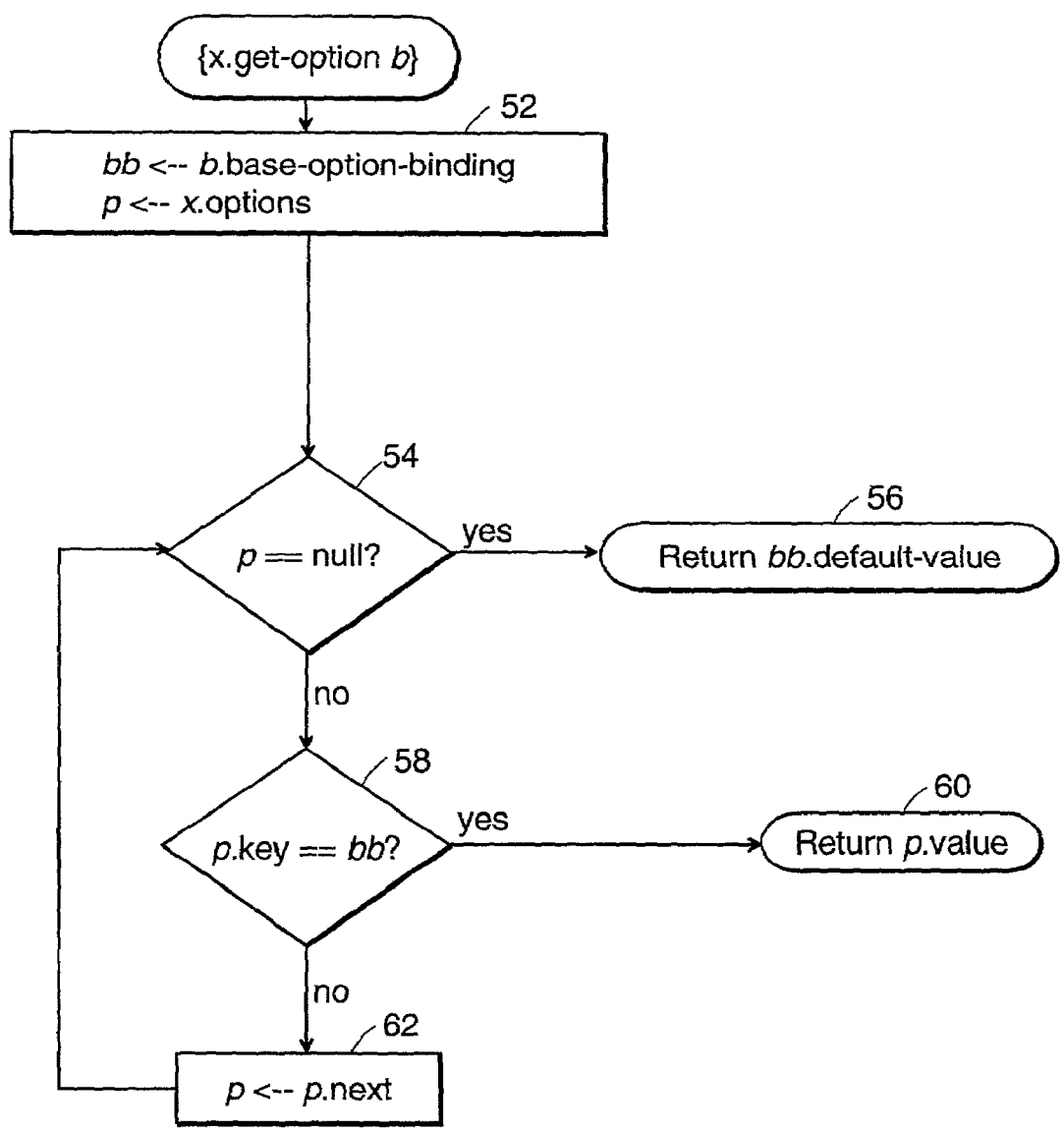
FIG. 4 is a flowchart illustrating the process of getting a local option value.

The operation of the get-option method is illustrated in the flowchart of FIG. 4. At 52, the variable bb is defined as the base-option-binding of b, and the variable p is taken as the options pointer from the instance object (e.g., 42). If at 54, it is determined that the options pointer is null, the default value is returned from the base option binding at 56. In the example of FIG. 2B, for example, the default value 5.0 is returned from option binding 30. If the option pointer is not null, the pointer is used to access the first option item, and the key of that option item is compared to the base option binding at 58. If there is a match, such as at 46 in FIG. 2C, the value of the option item 46 is returned at 60. If there is no match, the pointer p becomes the next pointer of the option item at 62 and is checked for null at 54. The process proceeds until a value is returned.

Certain subclasses of OptionList use subclasses of OptionItem to represent the option items. This flexibility allows additional information to be attached to the option items for certain purposes. For example, Table class represents tables that have rows and columns represented by the classes TableRow and TableColumn, each of which is a subclass of OptionList. The OptionItem subclass used by TableRow and TableColumn has an extra field for a sequence number that records the order in which options were set. Thus, when a given option is looked up by a table cell, its associated row and column are both queried for the presence of that option. If the option is set on both of them, the conflict is resolved by returning the value associated with whichever option item was set more recently. Further information about this extension is presented below.

The separation between the abstract OptionCache class and the concrete OptionList class allows the Curl language to accommodate alternative representations for the collection of currently set options. For example, OptionCache can have another subclass OptionHashTable that maintains a hash table of currently set options instead of storing the information as a linked list. Thus, classes that inherit from OptionHashTable instead of OptionList would rely on the hash table to define options. Since the compiler translates an option operation into a method call on an object, and it is the object which defines the operations, the compiler need not specify a routine or be aware of the specific data structure used for a particular option.

Figure 2F:
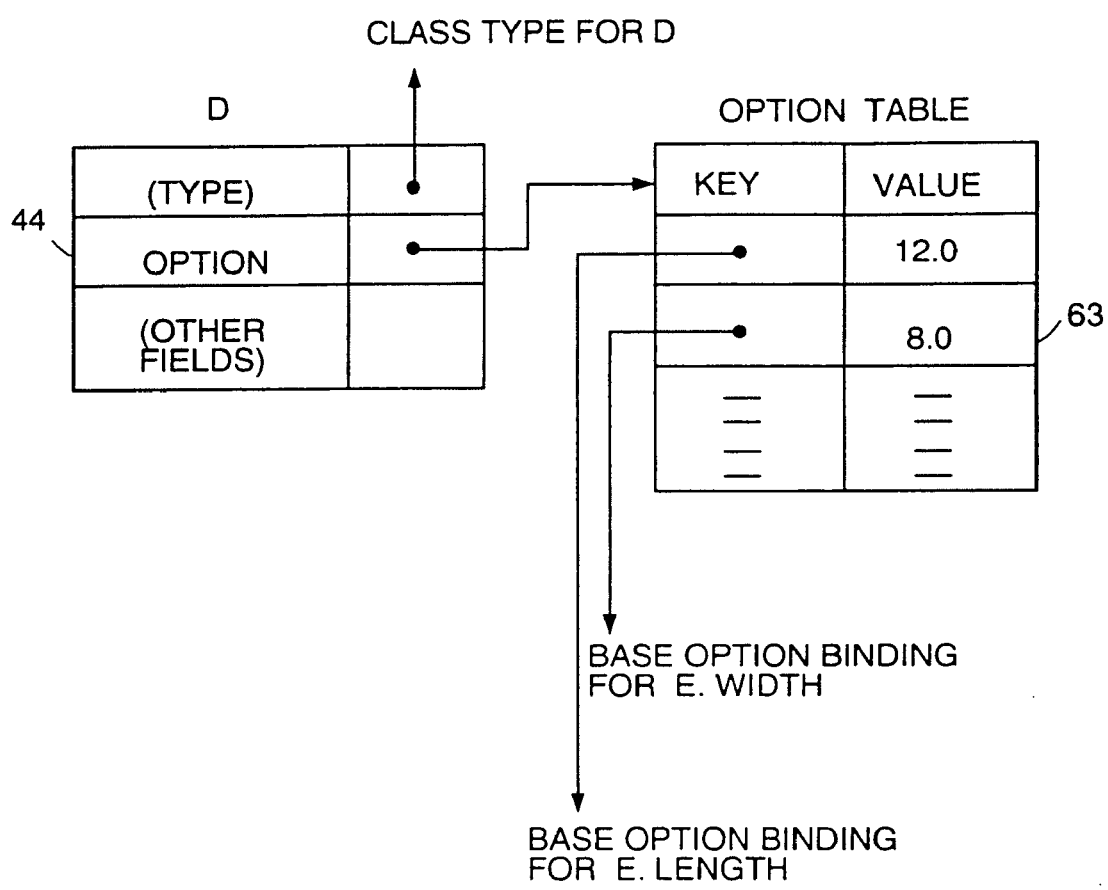

For example, FIG. 2F illustrates the case of an instance object 44 which points to a class type D. Class type D inherits from a class E which, in turn, inherits from OptionHashTable. The options pointer of instance 44 points to an Option Table 63, rather than a linked list. Option Table 63 includes pointers to base option bindings of class E as keys and includes specific values for those keys. Only keys for which values have been set are included in the table.

Invoking Change Handlers

When an option item is created or modified, the associated change handlers need to run. First the most specific option binding is located by getting the option name out of the option key (base option binding) and then, using the routines of FIGS. 3A and B, finding the most specific option binding for that name in the class of the object whose option value has changed. This most specific option binding is the head of a chain of option bindings that can be traversed by following the superclass option binding pointers. Each of these option bindings has a field that may contain a pointer, supplied during compilation, to a change handler procedure. Each change handler found during this traversal is invoked.

Each change handler procedure is a procedure of two arguments. When invoking a change handler procedure, the first argument should be the object (instance) whose option changed, and the second argument should be the new value of that option for that object.

Figure 5:
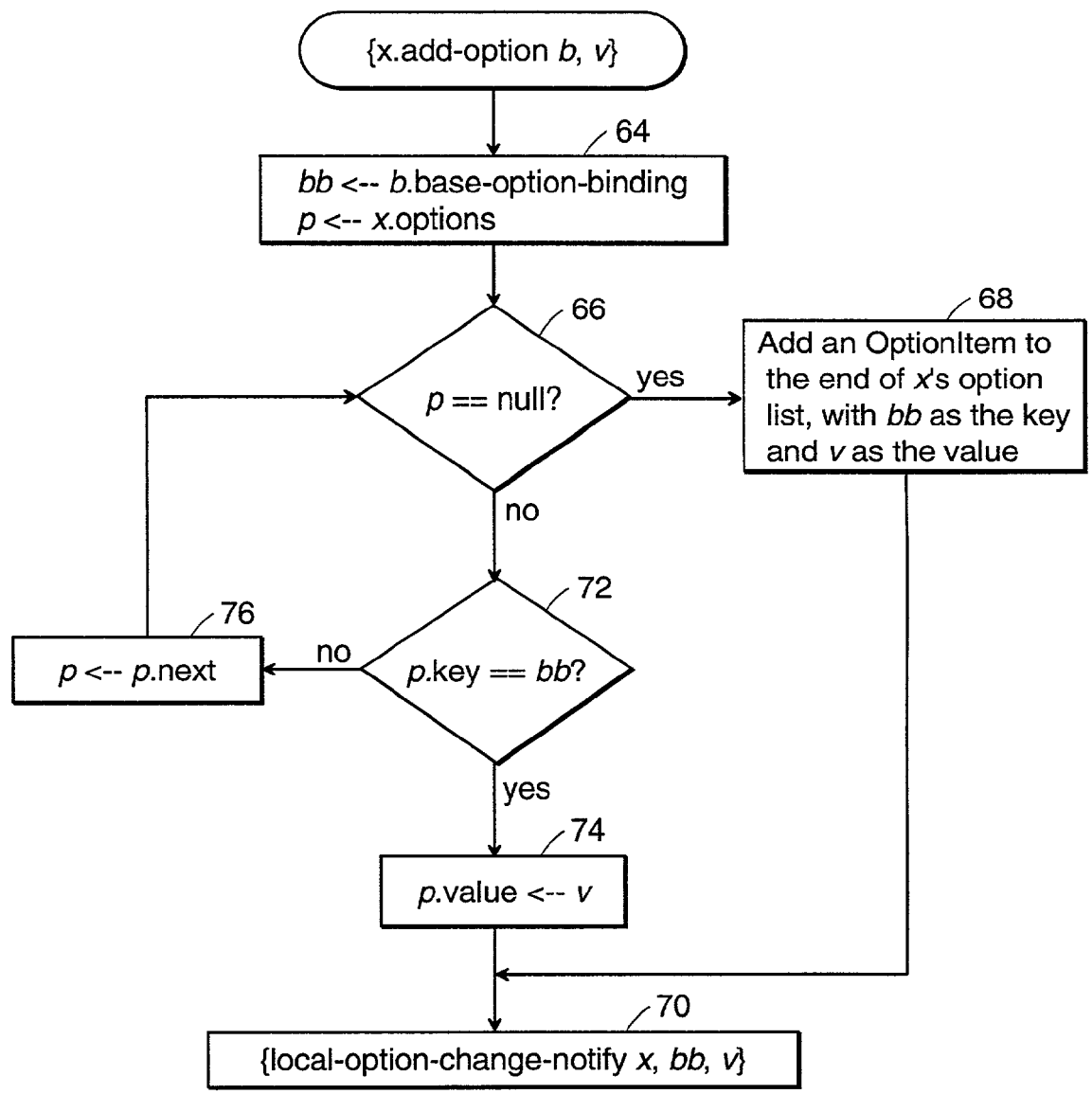
FIG. 5 is a flowchart illustrating the method of adding a local option value to an option list.

For example, when a program contains an operation to set a local option value (e.g., set x.length=v), the compiler translates that operation to a method call {x.add-option b, v} where b is the most specific OptionBinding for the length option for the ClassType object that represents the type of x. The operation of the add-option method is illustrated in the flowchart of FIG. 5.

At 64, bb is defined as the base-option-binding of b, and a pointer index p is set equal to the options pointer of the instance object. If the pointer is null at 66, an option list is begun by adding an option item at 68, the option item having the base option binding as a key and v as the value. Then, at 70, notification of the change is made as discussed below. If at 66, the pointer p is not null, it is used to access the first option item and the key of that option item is compared to the base option binding at 72. If there is a match, the value of that option item is changed to v at 74 and notification through change handlers is made at 70. If at 72, the key does not match, the pointer index p takes on the value of the next pointer of the option item at 76 and the system returns to the null check at 66. The system continues to walk through the option list until the value is set in an appropriate option item or the next pointer is null and an option item is added with the value.

The subroutine {local-option-change-notify x, bb, v} runs the change handlers on the object x, for the option whose base option binding is bb, to notify the object's change handlers that the value of this option has become v. This subroutine operates as in FIG. 6. At 78, c is the class type object that represents the type of the instance object. For example, for the instance object 42 of FIG. 2C the class type object is object 40 of FIG. 2A. The subclass binding sb is determined as the most specific option binding 34 of class 40 having the same name as the base option binding 30 referenced in the changed option, item 46 in FIG. 2C. One might expect that this binding sb would always equal the binding b referenced at 64 in FIG. 5. However, this is not necessarily the case. The binding b will be the most specific option binding for the class that is the declared type of the variable or expression x, but sb will be the most specific binding for the class that is the actual type of the value used for x. This latter class may be a subclass of the former class, and hence the most specific option bindings in the two cases may differ.

At 80, it is determined whether the subclass binding sb has a change handler. If so, as in the case where sb is option binding 34, that change handler is called with the value v as the new option value at 82. Then, at 84, the superclass option binding of the subclass binding sb is followed. In the case of FIG. 2A, the superclass option binding is the same as the base option binding, but in more complex cases, other intermediate classes may be referenced. If the option binding had no change handler at 80, the system would in any case continue to follow a thread of superclass option bindings at 84. At 86, it is determined whether that new superclass option binding is null at 86, and if so, the routine is done at 88. If not, the change handler is checked at the next superclass option binding at 80 and the system continues.

Obtaining the most specific option binding is a potentially expensive operation, since it needs to be done at run time each time the value of an option changes. The straightforward implementation of this operation is a potentially expensive search of the data structures generated by the compiler when the classes in question were compiled, but there is a shortcut. A hash table, indexed by the option name and the class of the object on which the option is being changed, can quickly yield the right option binding. When (as is currently the case in the Curl language) option declarations can occur only within class definitions, this strategy is safe because options on a class can only be set after instances of the class are created, which in turn can only happen after the class definition has finished being compiled. Once a class definition has been compiled, the mapping between option names and their most specific option bindings for that class can never change, so there is no risk of the information in the hash table becoming invalid.

Figure 7A:
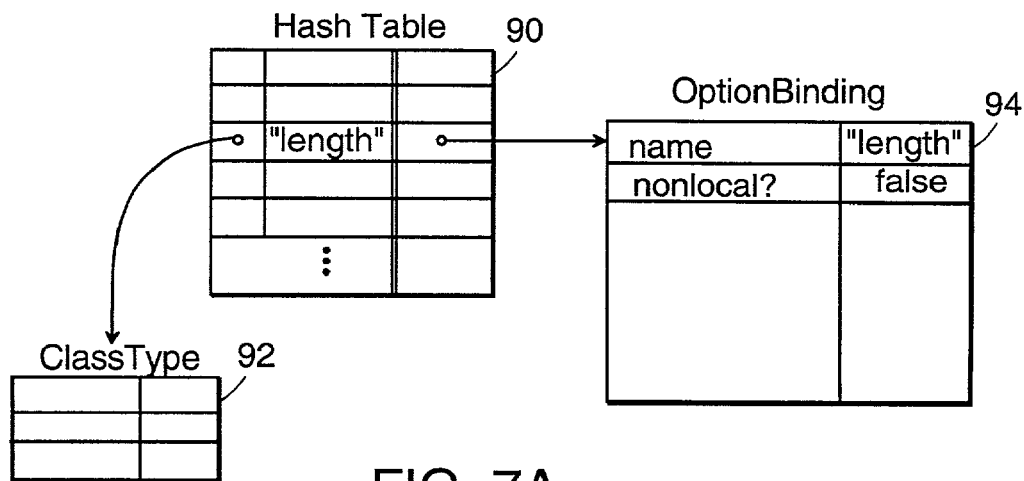
FIGS. 7A illustrates a hash table for rapidly identifying option bindings for options.
Figure 7B:
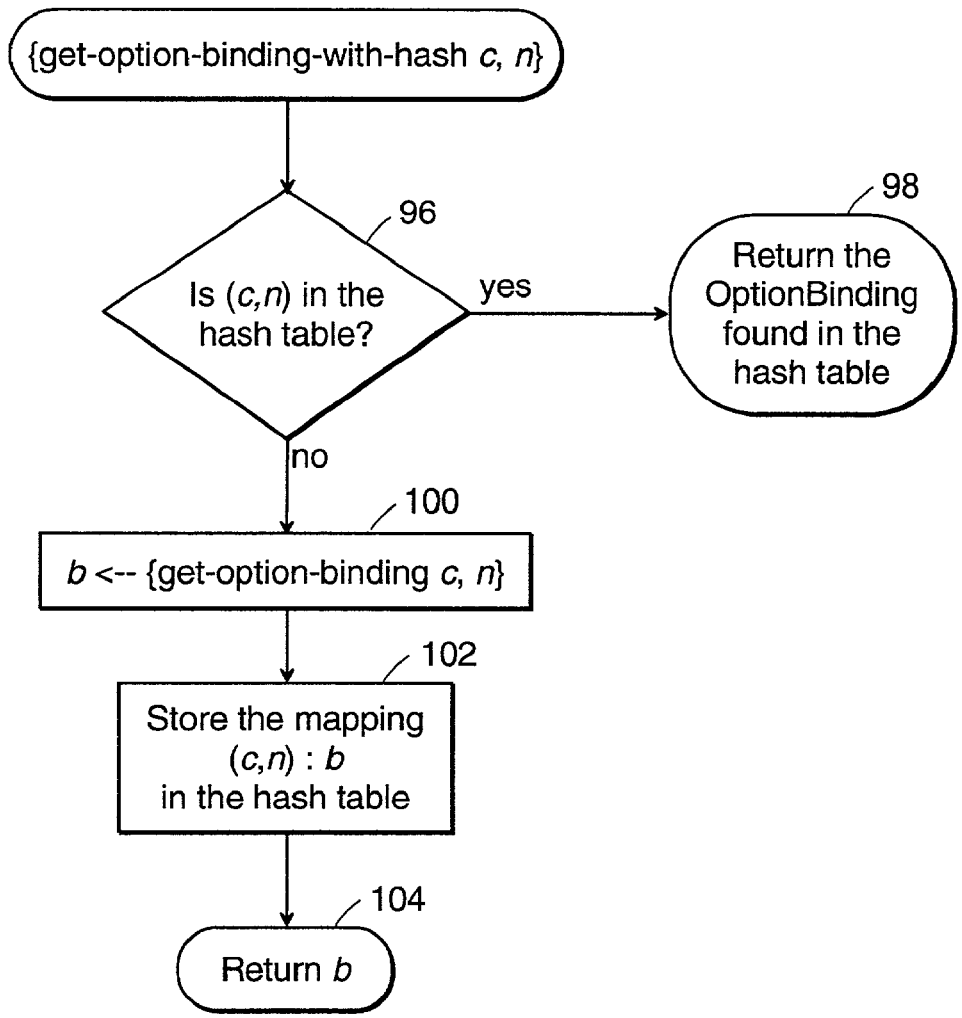
FIG. 7B is a flowchart illustrating a process of using the hash table of FIG. 7A.

A hash table to obtain most specific option bindings is illustrated in FIG. 7A. Each entry in the hash table 90 includes a pointer to a class type object 92 and an option name such as "length." It also includes a pointer to the most specific option binding for that option name of that class type 94. For example, if ClassType 92 in FIG. 7A is the class type C 40 of FIG. 2A, then OptionBinding 94 will be the option binding 34 of FIG. 2A. To access an option binding through the hash table, a subroutine {get-option-binding-with-hash c, n} is presented in FIG. 7B. At 96, the hash table is checked for the (class type, option name) pair. If there is a match, the option binding found in the hash table is returned at 98. If there is no match, the hash table is updated by first running the get-option-binding routine of FIG. 3B for that class and name. In that routine, the option bindings of the class and, if necessary, option bindings of its base classes, are searched for the required name. When the option binding is located, the mapping to that option binding is stored in the hash table at 102 and returned at 104.

Alternative embodiments may allow options to be declared for a class after the class itself has already been defined and instances of the class have already been created. In that case, the declaration of a new option outside of a class definition will need to invalidate the hash table so that it can be rebuilt from the new information in the class descriptors and option bindings. Since the declaration of new options is expected to be a very infrequent event compared to the setting of options and invocation of change handlers, the hash-table strategy will still provide a good performance improvement.

Nonlocal Options

Nonlocal options provide a mechanism by which the setting of an option value on one object can influence the value that is read using the same option name on another object. This sort of capability is useful, for example, in building hierarchies of graphical objects, where setting, say, the background color or font size on a table affects the background color or font size of the objects within the table.

In the Curl language, this capability is currently used within graphic hierarchies, which are trees of graphical objects rooted (typically) by an object that represents a window visible on the screen. However, nonlocal options could be used in other situations not necessarily connected with graphics. Therefore, the nonlocal options mechanism is formulated in terms of an "option hierarchy" that could be, but need not be, a graphic hierarchy. In the case of a graphic hierarchy, an object's option parent is generally the same as its graphical parent, and an object's option children are generally the same as its graphical children. However, there are cases in the Curl graphics system in which an object's option parent and graphical parent differ. Further, members of a graphical (option) hierarchy are instances of classes which are members of a distinct class hierarchy. For example a text label may be a child of a VBox in a graphical hierarchy, and its type TextLabel may separately be a subclass of the Graphic class in a class hierarchy.

With nonlocal options, an option at one node of a graphical object propagates down through its children. When a change is made in the option at the root node, all of the descendants which make use of that option must be notified of the change and the change handlers for each of those descendants must be processed. With a get or is-set? operation on local options, it is sufficient to check just the option list of the particular object of the method call, followed (in the case of a get operation) by use of the default value in the base option binding if the option is not within the option list;

with nonlocal options, however, the option list of each ancestor in the graphical hierarchy must be checked for the option before the default value is returned. Similarly, with a change in an option value, it is not sufficient that the change handler of the affected object and the like change handlers of that object's ancestors in the class hierarchy be processed. Rather, all associated change handlers must be processed throughout the class hierarchy of each affected descendant object in the graphical hierarchy.

An object in an option hierarchy can have one "option parent" and some number (possibly zero) of "option children." If b is an object and z is declared as a nonlocal option, the evaluation of the expression b.z proceeds as follows. If there is an option item corresponding to z on b's option list, the associated value is returned. If not, then if b has an option parent, the same operation is repeated on b's option parent and so on until either a value for z is found or an object with no option parent is reached. If no value is found anywhere along the chain, then the default value of the option is returned.

Similarly, when the operation

{is-set? b.z} is performed on a nonlocal option z, the result is true if the option is set anywhere along the path of option parents starting with the object b.

Setting and unsetting of nonlocal options works in much the same way as with local options. In particular, when these operations are performed on an object, they never affect the object's option parent or more distant option ancestors.

set b.z=17 adds or updates an option item attached to b, and unset b.z removes the option item that is attached to b and corresponds to z; if there is no such option item, then the operation does nothing. A distinction from local options to be discussed below is that it is not sufficient that just the change handlers of class ancestors of the changed object be processed. Additionally change handlers of the object's graphical descendants and their class ancestors must also be processed.

A unique characteristic of nonlocal options is that it must be possible to set a nonlocal option on any object d in an option hierarchy, even if the option is not explicitly declared in the class D of the object d or on any of D's superclasses. This is required because, for example, in a graphic hierarchy one may want to set some option such as font-size on a container object that displays no text itself but which may have child objects that display text. To affect the appearance of all of these children with one option assignment, the option must be set on the container.

Figure 8:
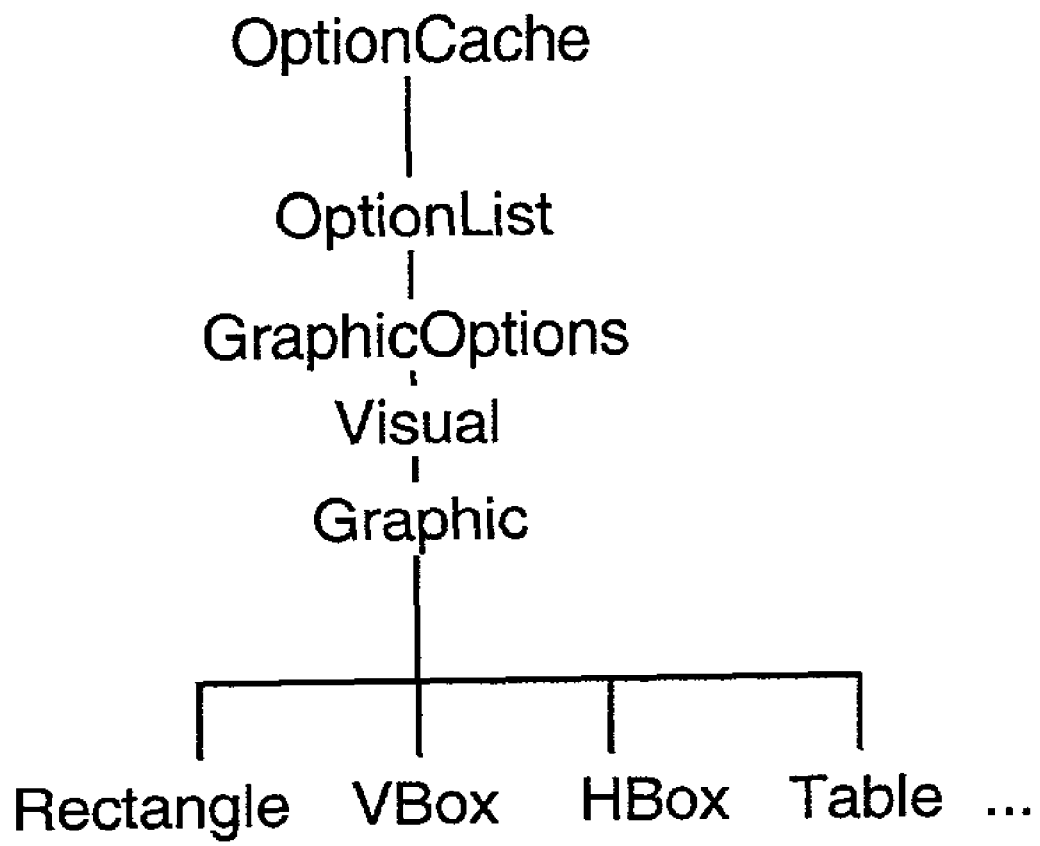
FIG. 8 illustrates a class hierarchy for graphical objects in a system embodying the invention.

This requirement is supported in the Curl language graphic hierarchies by establishing a common class GraphicOptions that is a subclass of OptionList and is a superclass of Visual, which is in turn a superclass of every graphical class. Ignoring other classes not relevant to this discussion, the resulting class hierarchy looks like FIG. 8.

If, say, the definition of the Rectangle class contains a declaration such as

{nonlocal-option background: any="white"} an option binding for background will also be created in the class GraphicOptions, which means that the background option will be able to be set not just on a Rectangle but also on a VBox, HBox, or any other Graphic.

Figure 9:
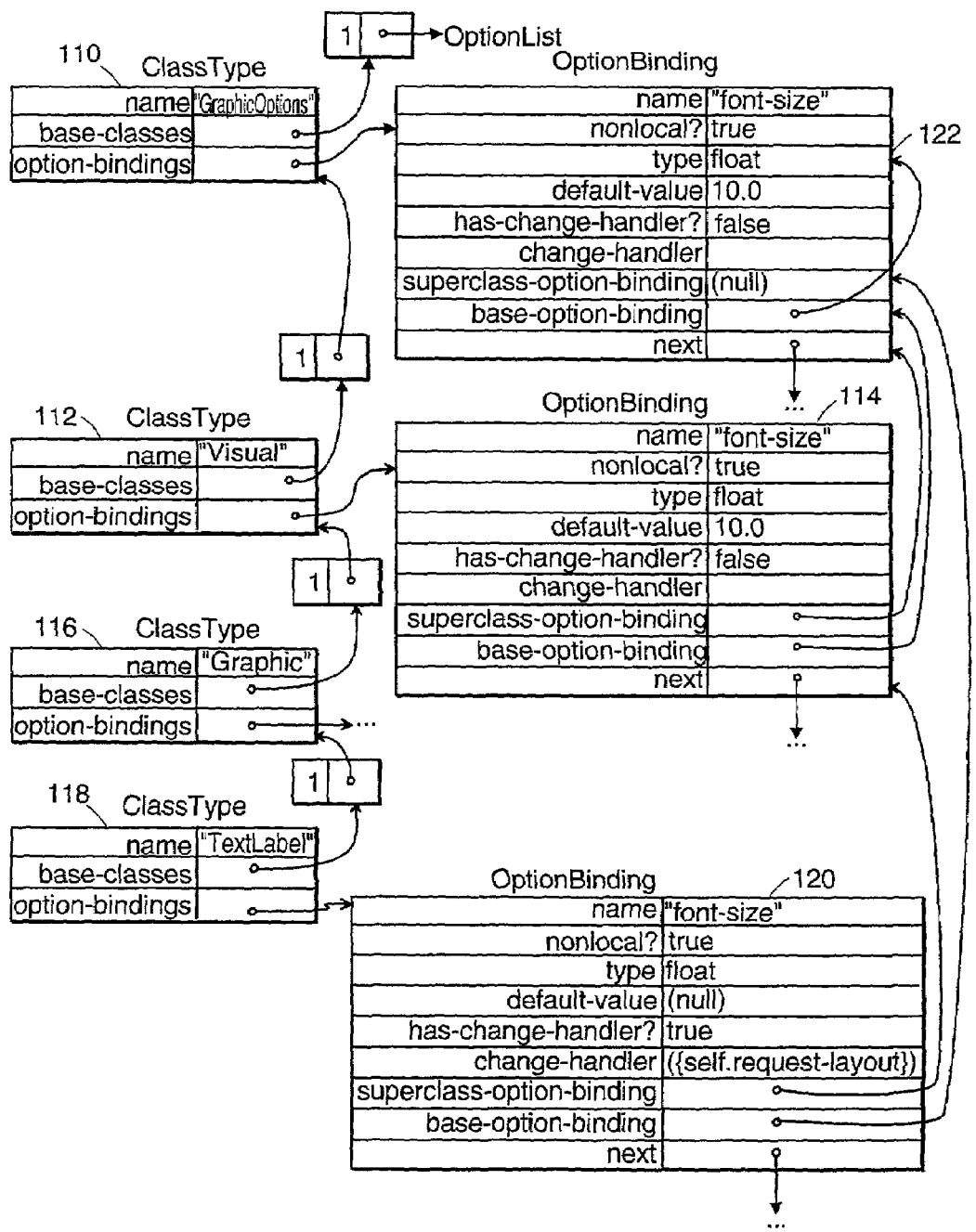
FIG. 9 illustrates an example class hierarchy with option binding lists for illustrating the use of nonlocal options in accordance with the present invention.

Consider the following code whose compilation produces the data structure of FIG. 9:

```
{define-class public GraphicOptions {inherits OptionList}
}
We can then define the following subclasses:
{define-class public Visual {inherits GraphicOptions}
    {nonlocal-option font-size:float=10.0
    }
    Other code
}
{define-class public Graphic {inherits Visual}
    Code that does not involve the font-size option
}
{define-class public TextLabel {inherits Graphic}
    {nonlocal-option font-size:float
        {self.request-layout}
    }
    Other code
}
```

The above definitions can be seen to compile directly to the class type object 110 from the GraphicOptions definition; to the class type object 112 having a "font-size" option binding 114 from the Visual definition; to the class type object 116 from the Graphic definition; and to the class type object 118 with "font-size" option binding 120 from the TextLabel definition. Further, when the nonlocal-option declarations are compiled, the compiler produces an Option binding for "font-size" 122 on the option-bindings list of GraphicOptions.

To avoid building knowledge of the GraphicOptions class into the compiler and restricting the options mechanism to the case of graphic hierarchies, the decision about where to create the base class option binding is implemented as follows. When a nonlocal option is declared for a class C, the compiler finds the superclass of C that is the closest to the root of the class hierarchy and contains concrete implementations of get-option and the other methods that provide the interface to the options implementation (add-option, remove-option, and option-set?). In the above example, this superclass is OptionList. The base class option binding is then created at the immediate subclass of this class that is located along the path toward the class C. In the above example, then, the base class option binding is created in the GraphicOptions class.

The provision of nonlocal options need not be coupled, as it is in the Curl language, with a strategy of storing option values in linked lists, even though the two approaches do complement each other well.

Figure 10:
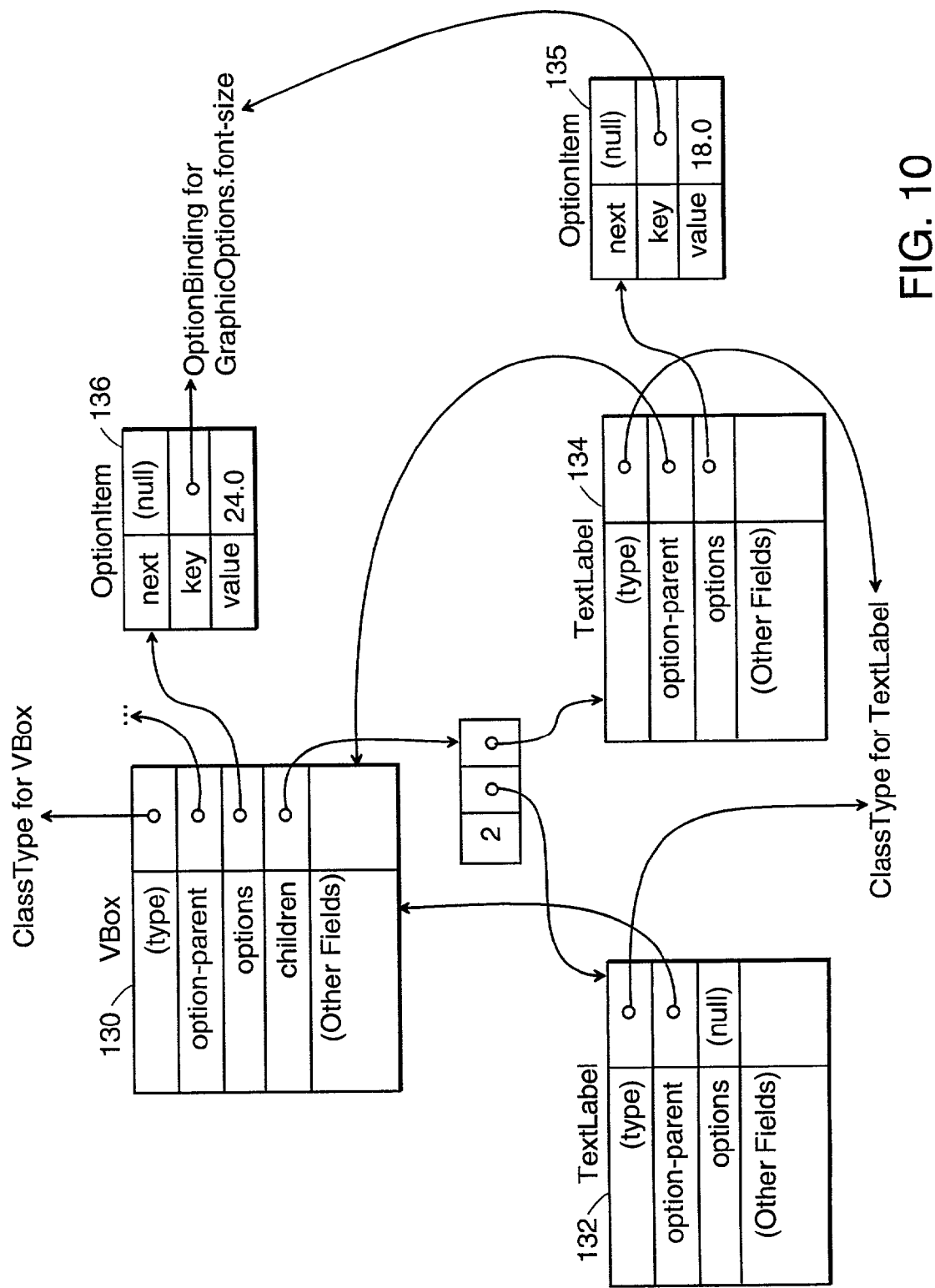
FIG. 10 is a sample graphical hierarchy for illustrating principles of the invention.

FIG. 10 illustrates a set of instance objects in a graphical hierarchy. An instance 130 of VBox has two TextLabel instances 132 and 134 as its graphical children. Each of the instances of TextLabel points to the class type for TextLabel 118 of FIG. 9. Each refers to the instance 130 as its option-parent. Only TextLabel 134 has an OptionList pointing to the option item 135. Option item 135 has as its key a pointer to the GraphicOptions. font-size option binding 122 of FIG. 9. VBox also includes an OptionList which includes an option item 136 having as its key the option binding 122.

Figure 11:
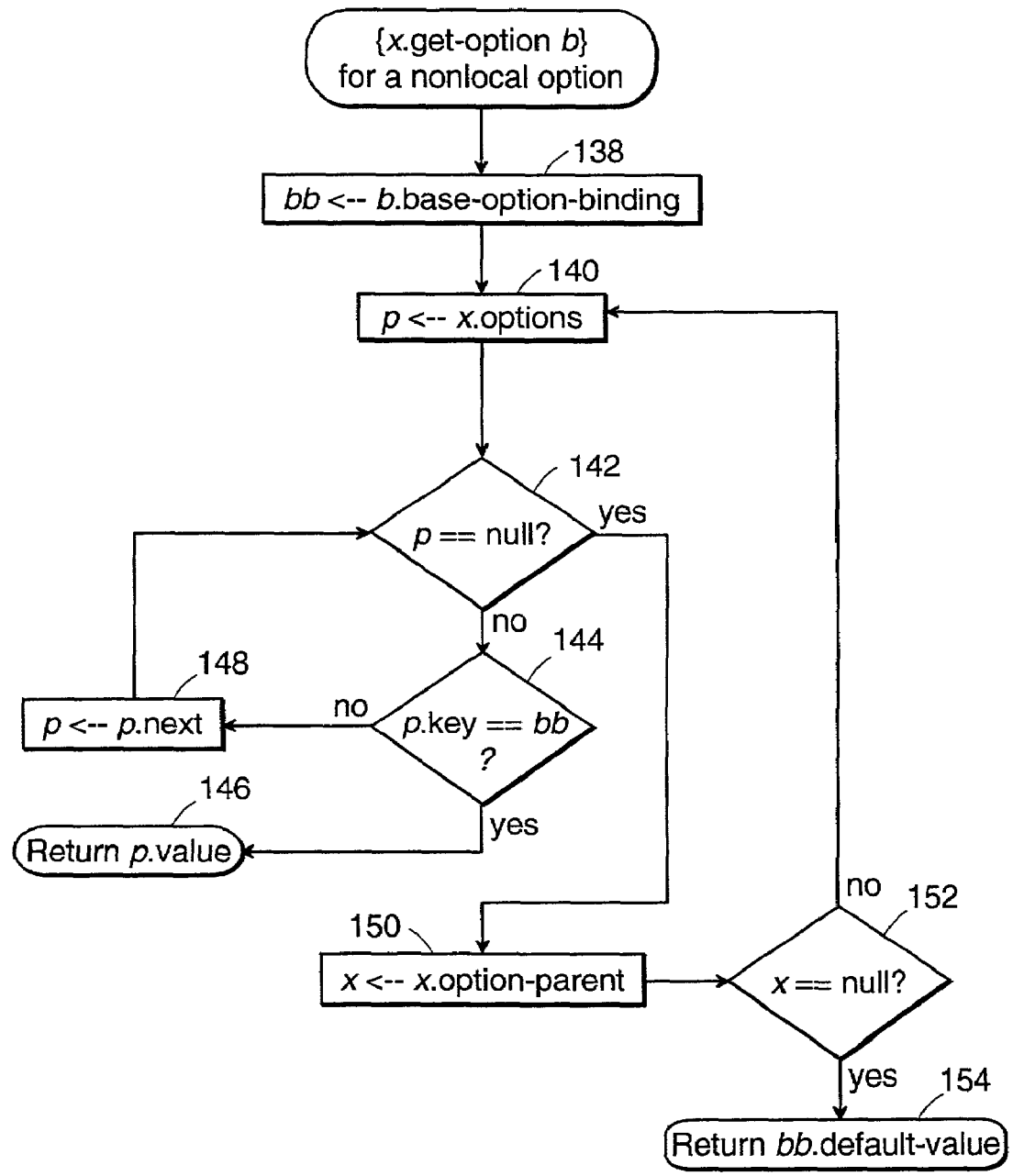
FIG. 11 is a flowchart illustrating the process of getting a nonlocal option value.

When a program contains an operation to get a nonlocal option value (e.g., x.font-size), the compiler translates that operation to a method call {x.get-option b} where b is the most specific OptionBinding for the font-size option for the ClassType object that represents the type of x. The operation of the get-option method when applied to a nonlocal option is illustrated in the flowchart of FIG. 11.

At 138, bb is defined as the base option binding of b. To get the font size option of either text label 132 or text label 134 of FIG. 10, that base option binding would be option binding 122 of FIG. 9. At 140, the index p is defined as the options pointer of the instance under consideration.

Consider the TextLabel 134 where it is determined at 142 that the options pointer is not null. Then, the pointer is followed to option item 135 where the key is compared to bb at 144. In this case, there is a match so the value 18.0 is returned from option item 135 at 146. If there had not been a match of the key, the linked list of option items would be followed by searching for a match of the key, changing the index key to the next value found in the option item. If no match were found in the option list, p would be null at 142 for the last option item. Similarly, if the instance of interest were TextLabel 132, p would initially be null because the options entry of instance 132 is null. In either case, the option parent pointer would be followed at 150 to the parent instance, a distinction from local options where the default value would be immediately returned from the base option binding.

In the case of option item 132, the option parent pointer leads to the VBox instance 130. If at 152 it is determined that there is no parent instance, the default value of the base option binding is returned at 154. In the above example, the value 10.0 would be returned from option binding 122. However, if as in the example of instance 132 there is an option-parent, the index p becomes the option pointer of that parent and any linked list of that parent is followed in the loop of 142, 144, 148. In the example of FIG. 10, the instance 130 points to option item 136 which, at 144, is noted to have a matching key, so the value 24.0 is returned at 146.

When a program contains an operation to determine whether a nonlocal option value (e.g., x.font-size) is set, the compiler translates that operation to a method call {x.option-set? b} where b is the most specific OptionBinding for the font-size option for the ClassType object that represents the type of x. The operation of the option-set? method when applied to a nonlocal option is illustrated in the flowchart of FIG. 12.

Figure 12:
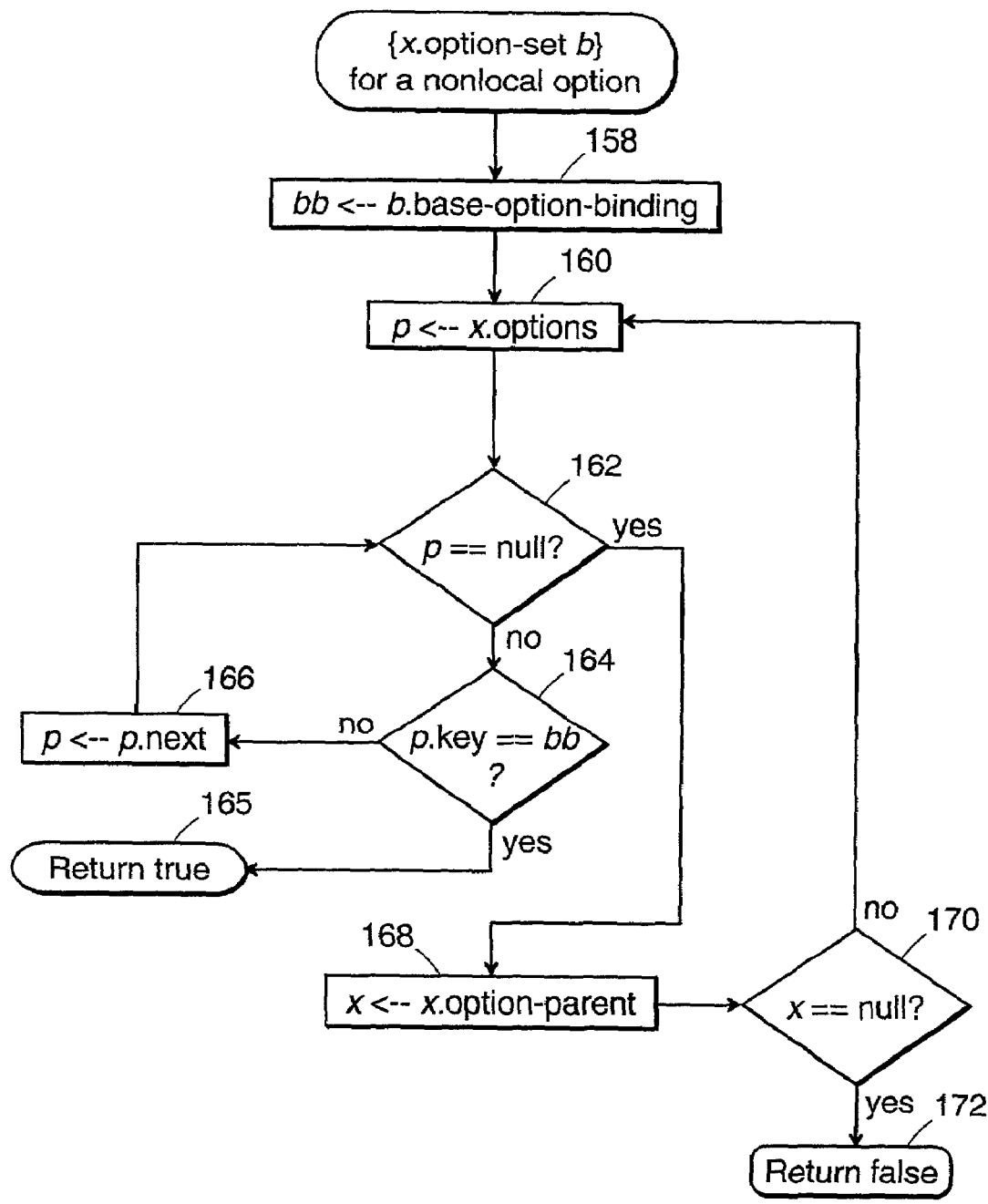
FIG. 12 is a flowchart illustrating the process of determining whether a nonlocal option value has been set.

The FIG. 12 procedure is very similar to that of FIG. 11 except that when a key is found to match the base option binding at 164, a true response is returned at 165, and once all linked lists of the instance and its parents have been searched to find no match, a false is returned at 172. More specifically, at 158 bb is defined as the base option binding, and at 160 the index p is defined as the options pointer of the instance being reviewed. If that pointer is determined to not be null at 162, the key of the first option item is compared with the base option key at 164. The search of the option list continues through 166. Once the option list has been followed with no matches, the option parent of the instance is determined at 168. If that option parent is not null at 170, the option list of the option parent is searched.

Propagation of Information in the Nonlocal Option Hierarchy

Change handlers can be specified for nonlocal options as well as for local options, but the logic for determining when to invoke a change handler for a nonlocal option, and what arguments to supply to the change handler, is quite a bit more complicated than in the case of local options.

If a class such as Rectangle in the above example has a nonlocal option declaration such as {nonlocal-option background:any="white"
{self.repaint-background background}} then the repaint-background method of a Rectangle r will be invoked every time there is a change in the value of r.background. This means that the change handler needs to be invoked whenever the value of the background option is set at r or at any class ancestor of r whose background value is visible to r (i.e., is not shadowed by a value of the background option set at an intervening object). For efficiency, it is also desirable to limit the propagation of option-change notifications to subtrees of the option hierarchy containing at least one object that has a change handler for the option in question.

These goals are satisfied by code in OptionList that can examine data structures produced by the compiler and can produce a list of nonlocal option names for which that object has change handlers. OptionList has a method register-options that can be invoked to construct this list. Every object that can have option children must override this basic register-options method with additional code that asks the option children for their lists of registered options and merges all of this information into a list of options that is reported by its register-options method.

Figure 13A:
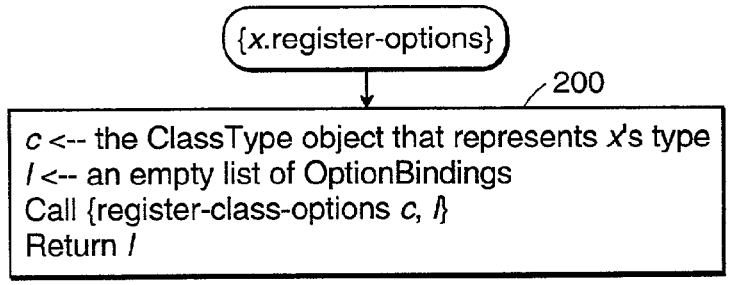
FIGS. 13A and 13B present a flowchart for the method of registering nonlocal options.
Figure 13B:
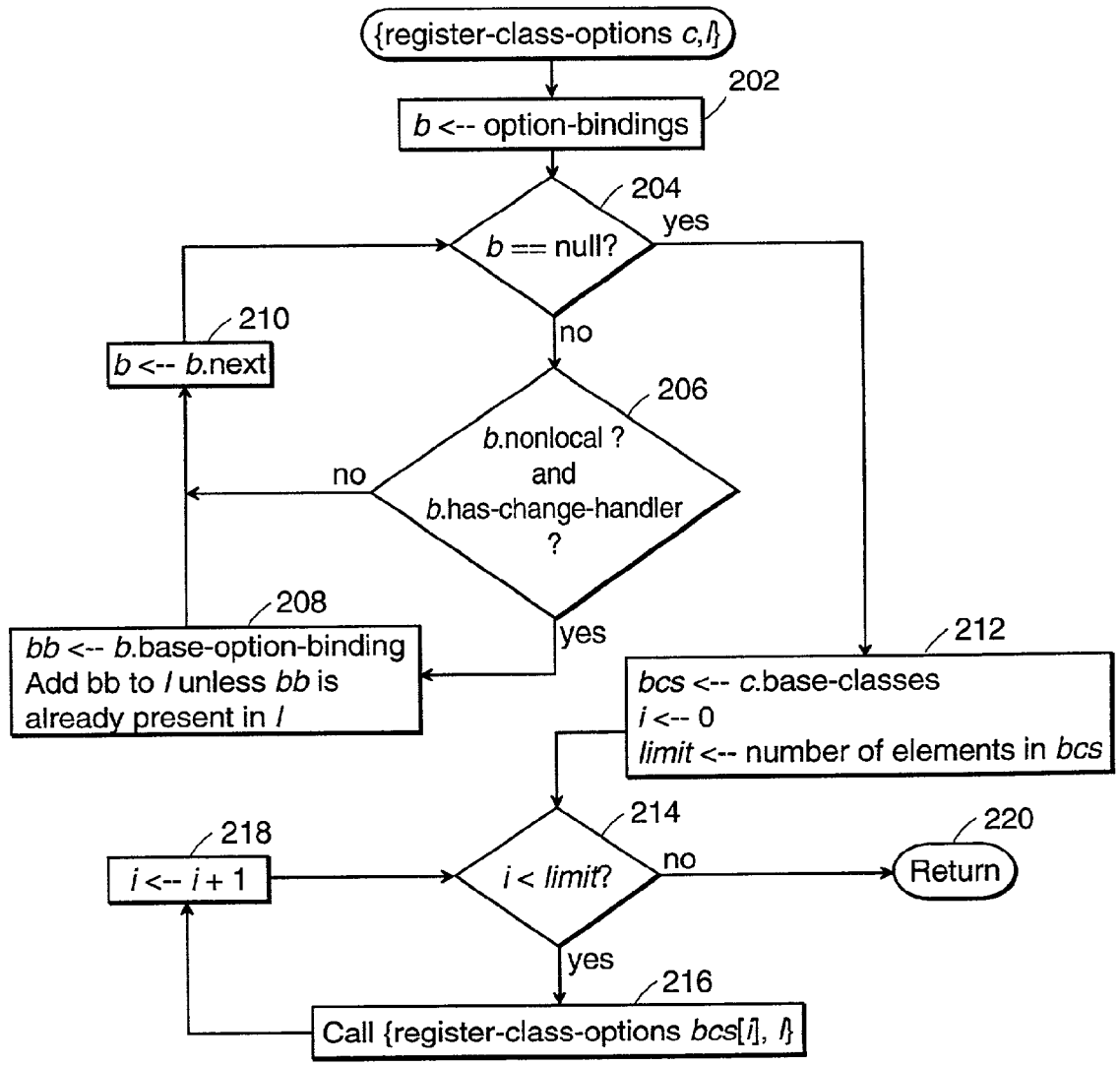

The operation of x.register-options when x has no option children proceeds via FIGS. 13A and 13B. In FIG. 13A, at 200, the variable c is defined as the class type object that represents the type of x, e.g., the type of TextLabel 134 that has no children. An empty list 1 of option bindings is established and is to be filled through a recursive process in which the option bindings of each class ancestor of the object, such as TextLabel 134, are checked to determine whether they include nonlocal options of c with change handlers. To perform that recursive search, a subroutine {register-class-options c, 1} of FIG. 13B is called. The completed list is a list of base option bindings for which this particular object, for example, TextLabel 134, is registering with the object OptionList for notification of any changes.

FIG. 13B will be explained relative to the class definitions of FIG. 9. At 202, the variable b is defined as the option bindings pointer of the TextLabel class type 118. At 204, b is determined to be not null since there is an option binding 120 on the class type 118. At 206, the option binding 120 is checked to determine whether it includes a nonlocal option with a change handler. With both conditions true, the base option binding of option binding 120, i.e., option binding 122 is added to the list at 208 unless that option binding had already been presented in the list.

At 208, it is the base option binding of the option binding which is included in the list. The class GraphicOptions serves as a common class in which all graphical objects can locate an option binding which can be recognized by every object in the graphical hierarchy. That is, the base option binding in GraphicOptions is a unique option binding to which all graphical objects refer when referring to an option such as the font size.

At 210, the system continues to follow the option binding list of class type 118 following the next pointers. Through this loop, each option binding of class type 118 which is nonlocal and has a change handler is added to the list. When that option binding list is complete, the system defines a set bcs which contains the base classes of class type 118, the immediate parents of class 118 from which the class directly inherits, at 212. The number of those class types is defined as the limit. In this case, class type 118 has only one parent, class type Graphic 116, which is included in the set bcs. At 214, the limit is greater than zero so the limit has not been reached. Thus, at 216 the subroutine register-class-options is called for the specified parent. As a result, all of the parents of the parent 116 are ultimately processed recursively. Specifically, at 216 the option bindings of class type 116 are checked and, through that pass of the subroutine register-class-options, all parents of class type 116 are similarly checked. Once all of the ancestors of class type 116 have been checked through subroutine calls and all of the appropriate option bindings have been added to the list 1, the index i is incremented at 218. In this case, there was only one parent to class type 118, so the limit is reached at 214 and the list is returned to OptionList at 220.

Figure 14:
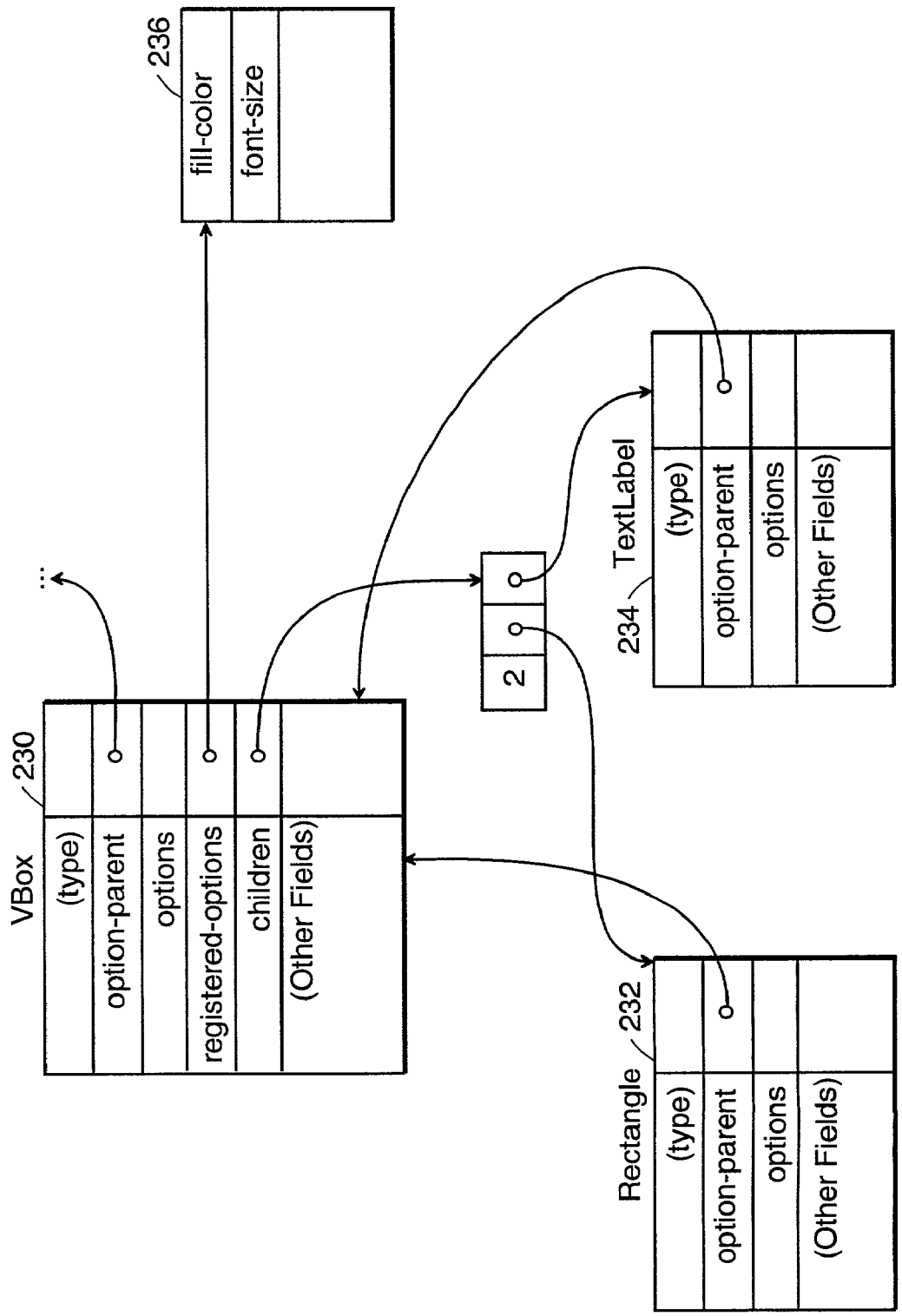
FIG. 14 presents another graphical hierarchy for illustrating principles of the invention.

Once an instance object such as Rectangle 232 or TextLabel 234 in FIG. 14 identifies an option for which it is registered to receive information, this option is included in the list of registered options in its parent VBox 230. That list of registered options is shown at 236. In the example of FIG. 14, the Rectangle registers to be notified about changes in the nonlocal option fill-color and the TextLabel registers to be notified about changes in the nonlocal option font-size. As a result, the registered-options field of the VBox points to a table of option names including both fill-color and font-size.

Figure 15:
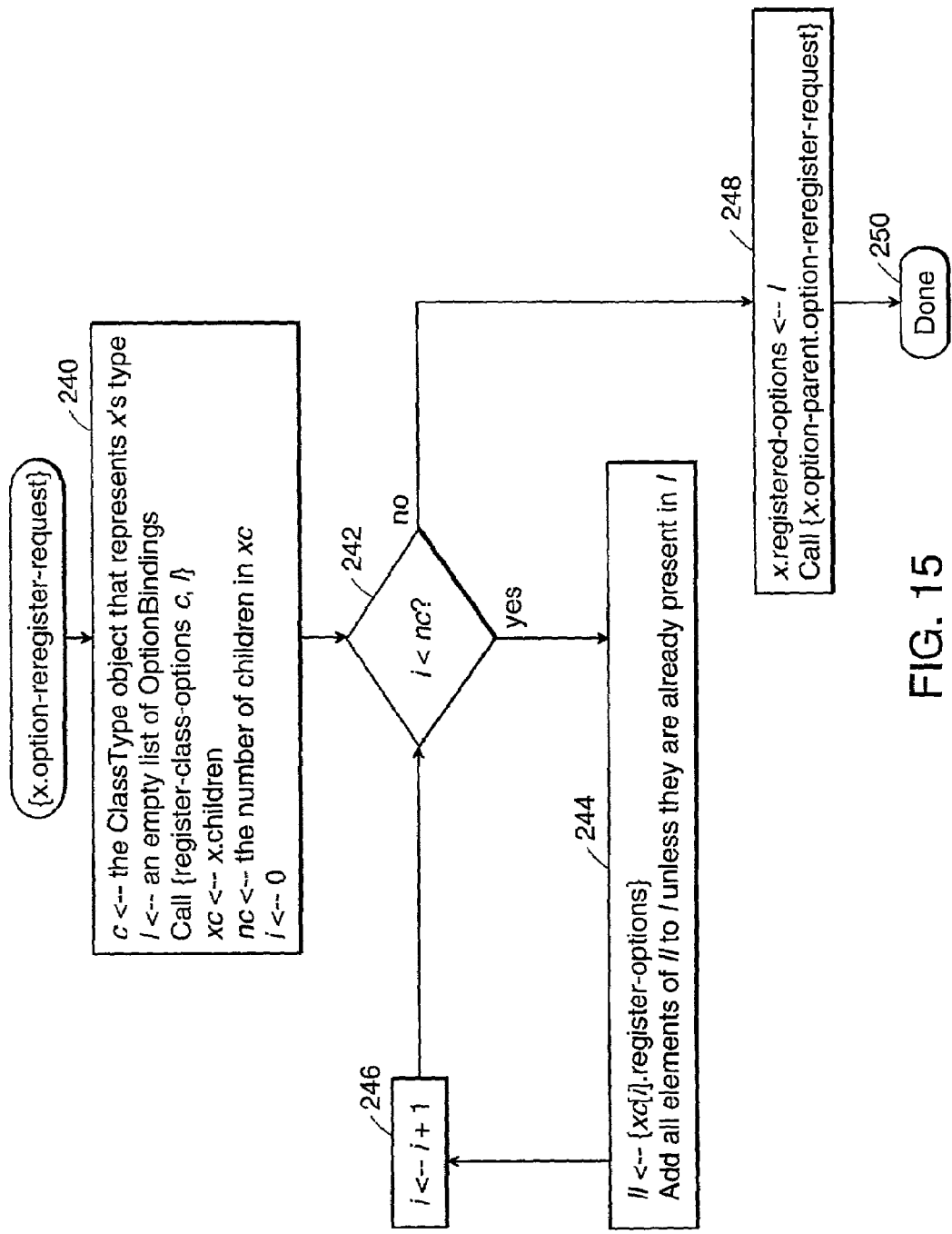
FIG. 15 is a flowchart for the process of reregistering nonlocal options.

Some option parents in the Curl language follow this procedure to recompute their registered option list each time they are asked for it. Other option parents save the registered option list when they compute it, and then just return the saved list of registered options if asked for it again. In either case, there is a need to notify option parents (and more distant ancestors) when a new object is added to the option hierarchy and has new option names to register. Thus, when an option parent p somewhere in the hierarchy gains a new child c, it invokes the option-reregister-request method of its option parent q unless it can determine that the addition of c to the hierarchy does not change p's set of registered options. This invocation prompts q to recompute its own set of registered options and, if necessary, propagate the reregister request higher up in the option hierarchy. Similar processing could occur when removing an object from the option hierarchy, to reduce its parent's set of registered options, but the Curl language does not implement a protocol for doing this.

Where an object such as VBox 230 of FIG. 14 has a list of registered options, during the reregistration process it must not only register its own options but those of its children. This process is performed as illustrated in FIG. 15. At 240, the register-class-options subroutine of FIG. 13B is called for an object such as VBox 230, thus obtaining a list of nonlocal option bindings with change handlers for all class ancestors of VBox 230. A set of graphical children to the VBox 230 is defined as xc with a number of children nc. The set xc contains all immediate children but not the more remote descendants of the object. The index i is initially set at zero. In this example, VBox 230 has two children 232 and 234 which are included in xc. At 242, the number of children nc is initially greater than zero, so at 244 the system initiates the register-options operation of FIGS. 13A and 13B for the first child rectangle 232. Recall that the process is a recursive process by which all nonlocal options having change handlers are identified for the class Rectangle and all of the class ancestors of Rectangles. Recall also that, if the object xc[i] can itself have option children, then the definition of that object will override the register-options method shown in FIG. 13A, adding processing to compute the options registered by the option children. The list of option bindings located in that operation are added to the list l. At 246, the index i is incremented, and in the example of FIG. 14, the system loops back at 242 to run the operation register-options for the TextLabel object 234.

Once the list 1 is complete, the list is used at 248 to complete the registered options list 236 for object 230, and the registration process is done at 250. Further, the option-reregister-request is next applied to the graphical parent, in this case the graphical parent of VBox 230. Thus, the reregistration process is required through the full ancestry of the graphical hierarchy, and at each object in that ancestry, all graphical children are caused to search their class hierarchies for nonlocal options having change handlers.

When a set or unset operation occurs on a nonlocal option z at an object a, the change handlers for z are invoked on a, just as though z were a local option. Then, each option child c of a that has registered for option z is notified of the change. If the option z is also set at c, no action needs to occur at c because the value c.z shadows the value a.z. If the option z is not set at c, then c's change handlers for z (if any) are invoked and then the process is repeated for those option children of c that have registered for z.

Figure 16:
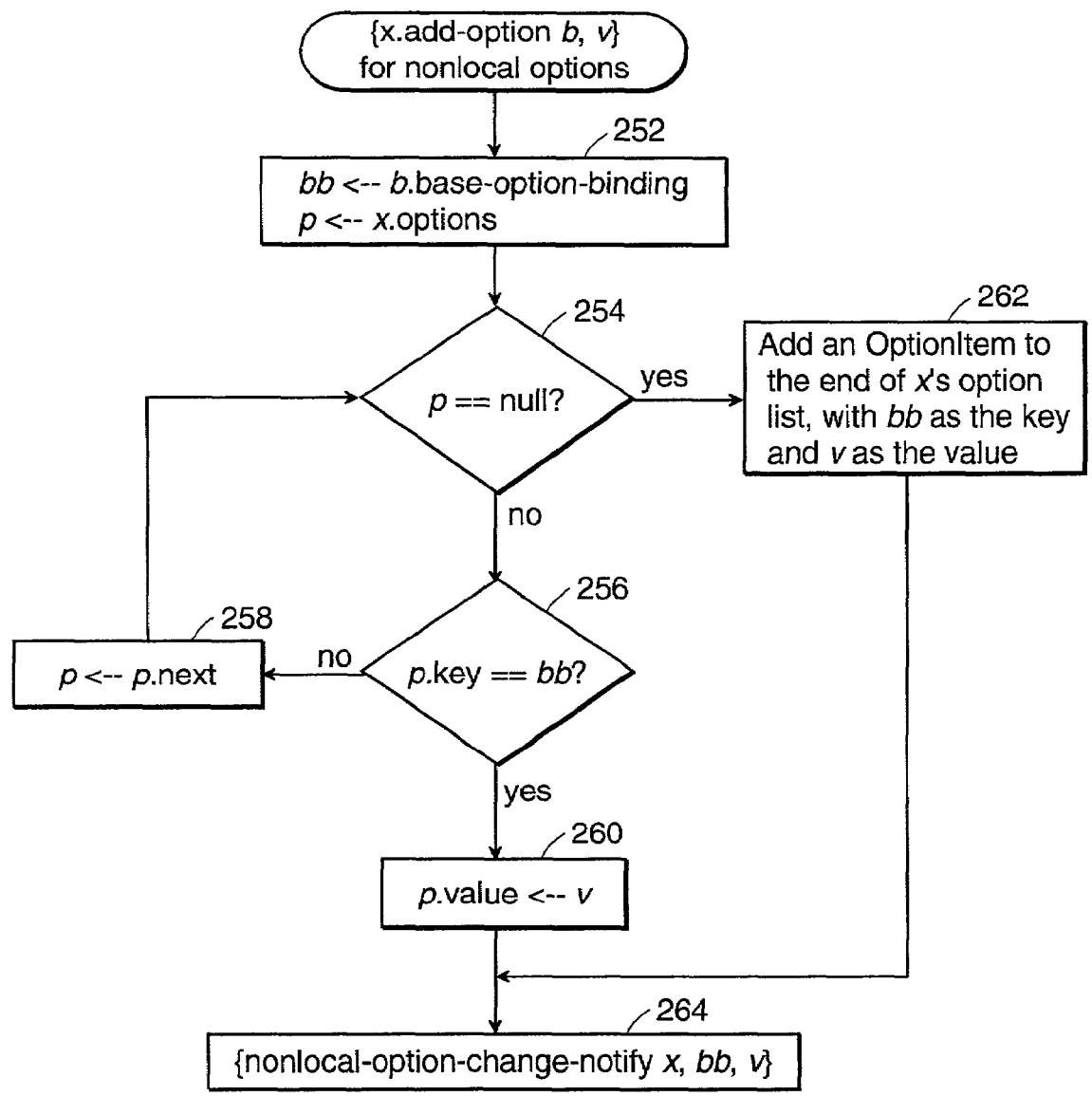
FIG. 16 is a flowchart illustrating the process of adding a nonlocal option value to an option list.

When a program contains an operation to set a nonlocal option value (e.g., set x.font-size=v), the compiler translates that operation to a method call {x.add-option b, v} where b is the most specific OptionBinding for the font-size option for the ClassType object that represents the type of x. The operation of the add-option method in this case is illustrated in the flowchart of FIG. 16. By comparison of FIG. 16 to FIG. 5, it can be seen that the operation of setting a nonlocal option to an option list is substantially the same as that of setting a local option. Specifically, from the definition of the base option binding and of the initial pointer to the option list at 252, the system searches the option list through the loop of 254, 256 and 258 to locate a matching key at 256. If that key is found, the value is changed at 260. If the key is not found, an option item is added to the list at 262. The difference in the two operations is that for nonlocal options, the subroutine nonlocal-option-change-notify is called at 264.

Figure 6:
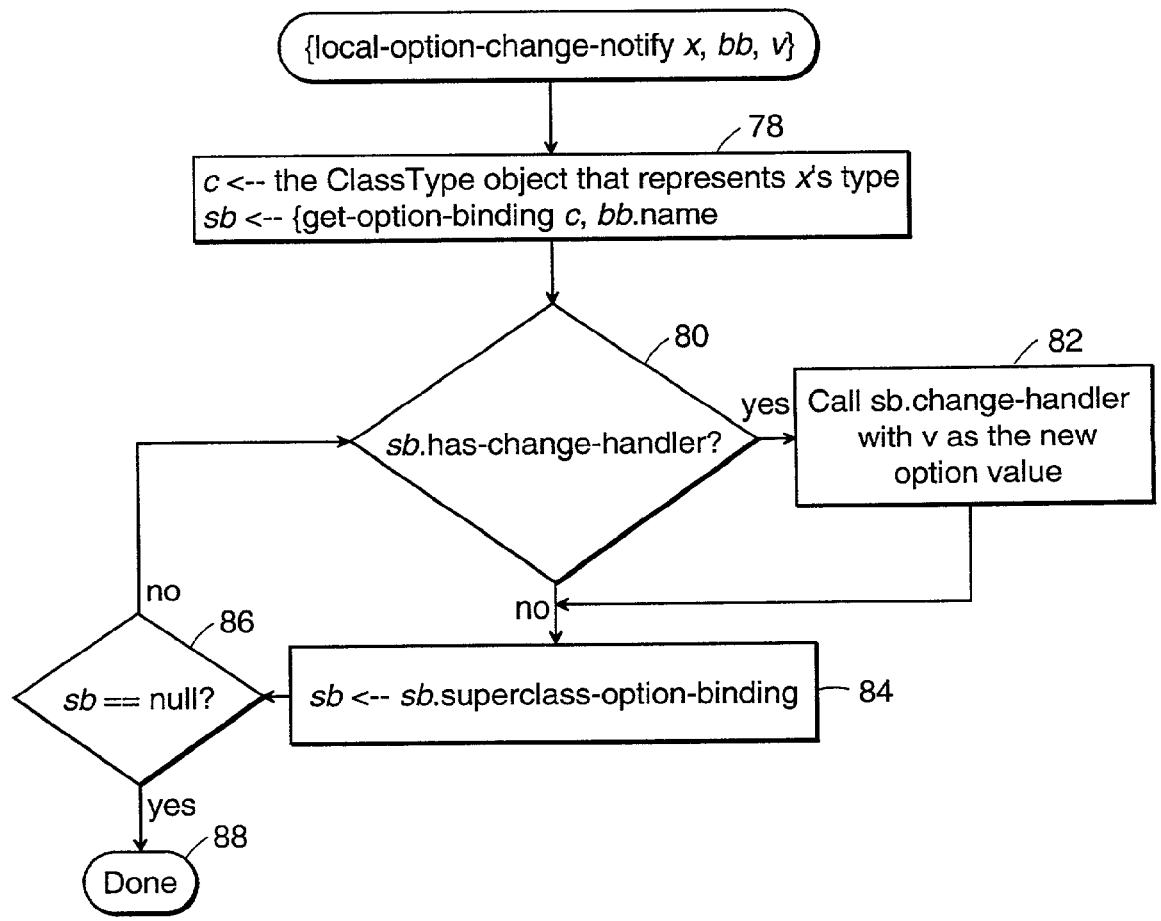
FIG. 6 is a flowchart illustrating the method of running change handlers when a local option value is changed.
Figure 17:
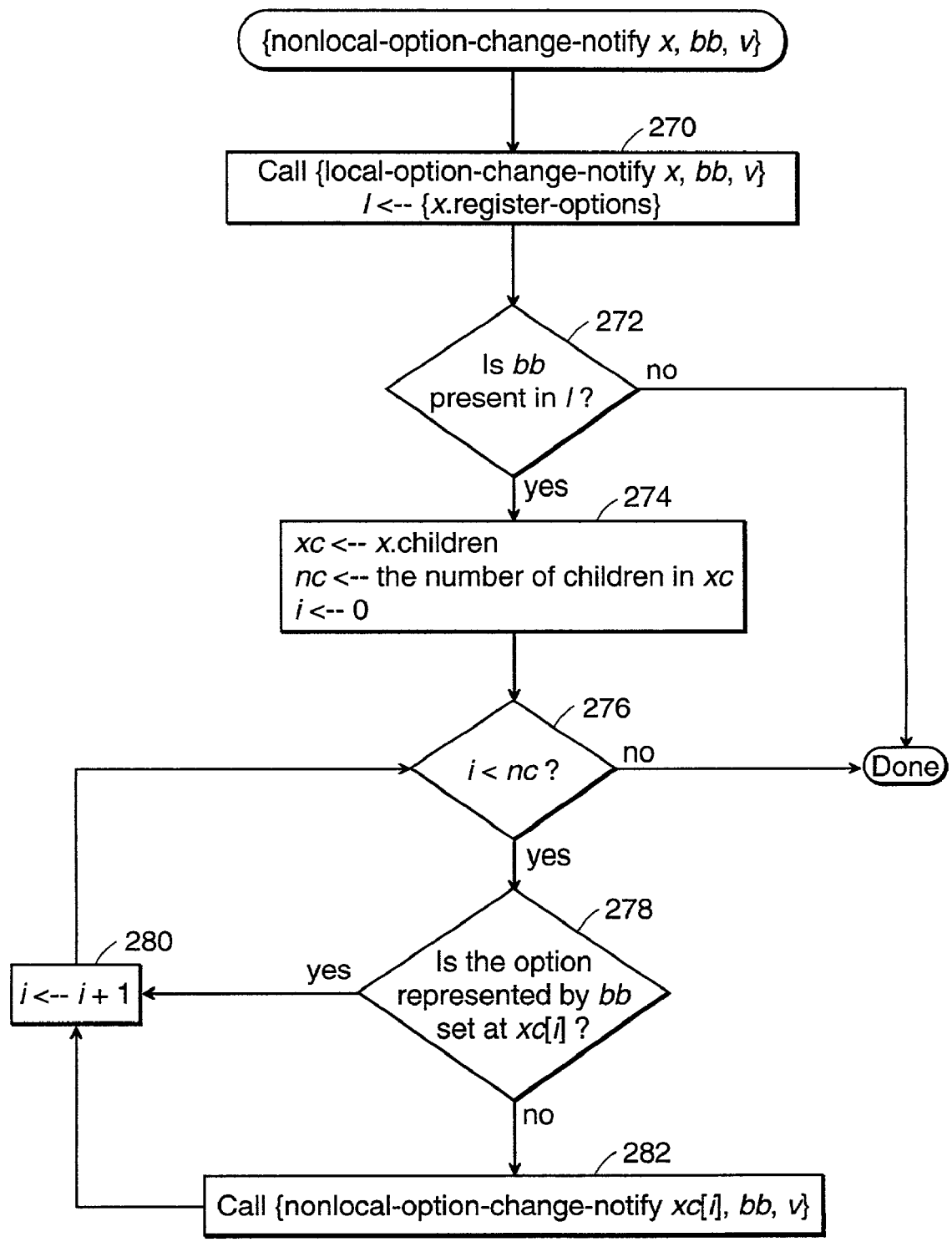
FIG. 17 is a flowchart for processing change handlers when a nonlocal option value is changed.

The subroutine {nonlocal-option-change-notify x, bb, v} runs the change handlers on the object x for the option whose base option binding is bb, to notify the object's change handlers that the value of this option has become v. The change handlers of x's option children and their descendants are also executed if appropriate. This subroutine operates as in FIG. 17. At 270, the local-option-change-notify routine of FIG. 6 is first called to process the change handlers of all of the superclasses of the object x. In addition, it is determined from the register-options list of the object, such as list 236 of object 230 in FIG. 14, whether any children need to be notified of the change in the option. At 272, it is determined whether the base option binding of interest is present in the list 1. If not, the process is done. If so, all graphical children of the object are notified. At 274, all immediate option children of the object x, such as object 230, are included in the set xc. The variable nc is set at the number of children, and the index i is set at zero. At 276, nc is compared to i to determine whether there are additional children to be notified. If so, at 278 it is determined whether the option represented by bb is already set in the option list of the child. If so, no notification is required and the index i is incremented at 280. If the option represented by bb is not included in that child's list, the nonlocal-option-change-notify subroutine of FIG. 17 is called for that child, at 282. As a result, that child will notify its own change handlers and also require that its children and their descendants notify their change handlers, if applicable.

Keyword Init Arguments

The Curl language allows both positional and keyword arguments to be supplied when an object is created. These arguments are supplied to the "init" (initialization) method of the object's class. The Curl language also allows an init method to specify " . . . " in its formal parameter list, in which case the positional and keyword arguments that didn't match other formal parameters specified by the init method are packaged up into an array.

By convention, graphical objects in the Curl language interpret most keyword arguments as specifications of options to set on the object, enabling the following sort of very compact initialization expression:

```
{VBox background="green", border-width=2 pt, font-family="serif",
  {text bold?=true, Top Dog},
  {Rectangle width=2 cm, height=1 cm, fill-color="red"},
  {text Bottom of the Barrel}}
```

Thus, instead of requiring separate set statements for each option argument, the values of options such as "background" and "fill-color" can be set through the single initialization expression.

Among the mechanisms provided by OptionList (actually, by a superclass of OptionList) is a method that can be used to scan for otherwise unmatched keyword arguments and apply them as option settings to the current object.

Packages and Sharing

The operating system process that executes Curl language computations is divided into a number of entities, referred to as CurlProcesses, that constitute the different protection and storage management domains of the application. Thus, in a Curl browser, each displayed page of content has its own CurlProcess, and system functions such as those that operate the "Back" and "Stop" buttons will operate within yet another CurlProcess. It is a goal of this architecture that packages of code can be loaded independently into the various CurlProcesses, so that certain classes would be loaded in some CurlProcesses but not in others. For time and space efficiency, however, it is desirable that when the same package of the code is loaded into more than one CurlProcess, the executable code and immutable data structures associated with the package should be shared and not replicated.

This architecture creates some challenges for the options mechanism, specifically the mechanism that creates OptionBindings for nonlocal options. If a package contains a class called Rectangle that declares a nonlocal option u, then according to the class hierarchy shown above, an option binding for u will be attached to the GraphicOptions class. However, the GraphicOptions class could be in a different package from Rectangle, and there could be some CurlProcesses in which both GraphicOptions and Rectangle are defined, while in other CurlProcesses it might be the case that only GraphicOptions is defined. The option u should only be visible in those CurlProcesses where Rectangle is defined, but simple schemes for managing option bindings would attach the bindings directly to the shared data structures that represent the GraphicOptions class, causing the option u to become visible in all the CurlProcesses.

To deal with this problem, the Curl language has a two-tier strategy for managing option bindings. Whenever an option binding attaches to a class that is defined in the same package that contains the option binding declaration, the binding is handled as described in the above presentation. If an option binding declared in a package P needs to be attached to a class in a different package Q, however, Q's shared data structures are not modified. Instead, an entry including the option binding is made in a hash table that is private to the CurlProcess into which P is being loaded. Now, in order to determine whether a given class C has an option binding for an option z, a two-step lookup process is required. This process must check both the shared package data structure and the CurlProcess-private hash table to see whether either of them contains the option binding of interest. Except for this difference, all of the implementation algorithms described above can be used unchanged.

Figure 18:
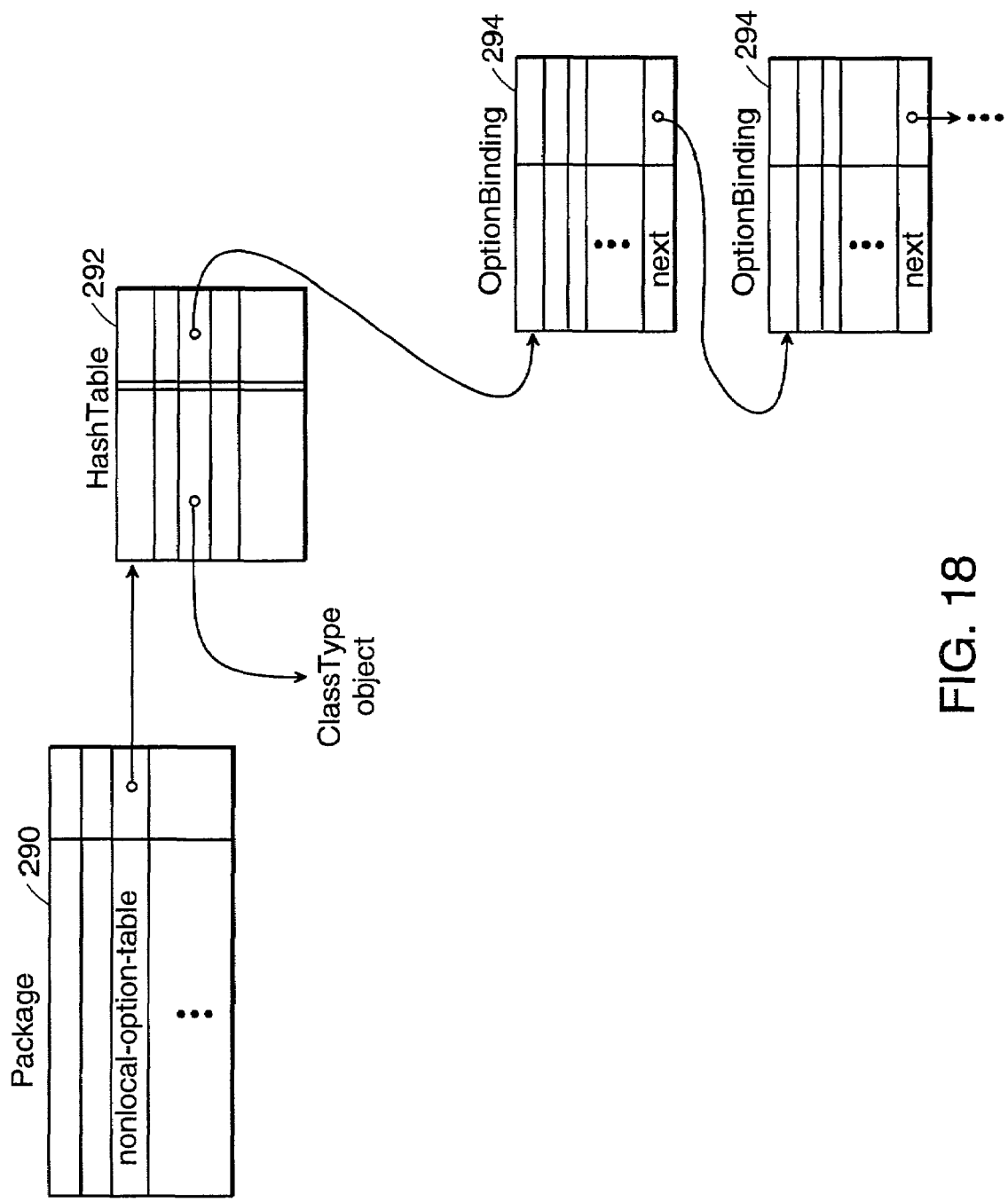
FIG. 18 illustrates the use of a hash table for processing nonlocal options in packages.

In FIG. 18, each package is represented by an object 290 of type Package, which has a field "nonlocal-option-table" that points to a hash table 292. Hash table 292 maps ClassType objects to OptionBinding objects 294 representing nonlocal options that should be treated as though they were part of the chain of OptionBinding objects pointed to by the option-bindings field of the ClassType object.

The presence of packages changes the logic of "get-option-binding" (FIGS. 3A and 3B) by adding more processing where FIG. 3B returns null. When packages are present, the "Return null" step in that flowchart is replaced by a search of the data structures shown in FIG. 18.

Table Row/Column Options

Figure 19:
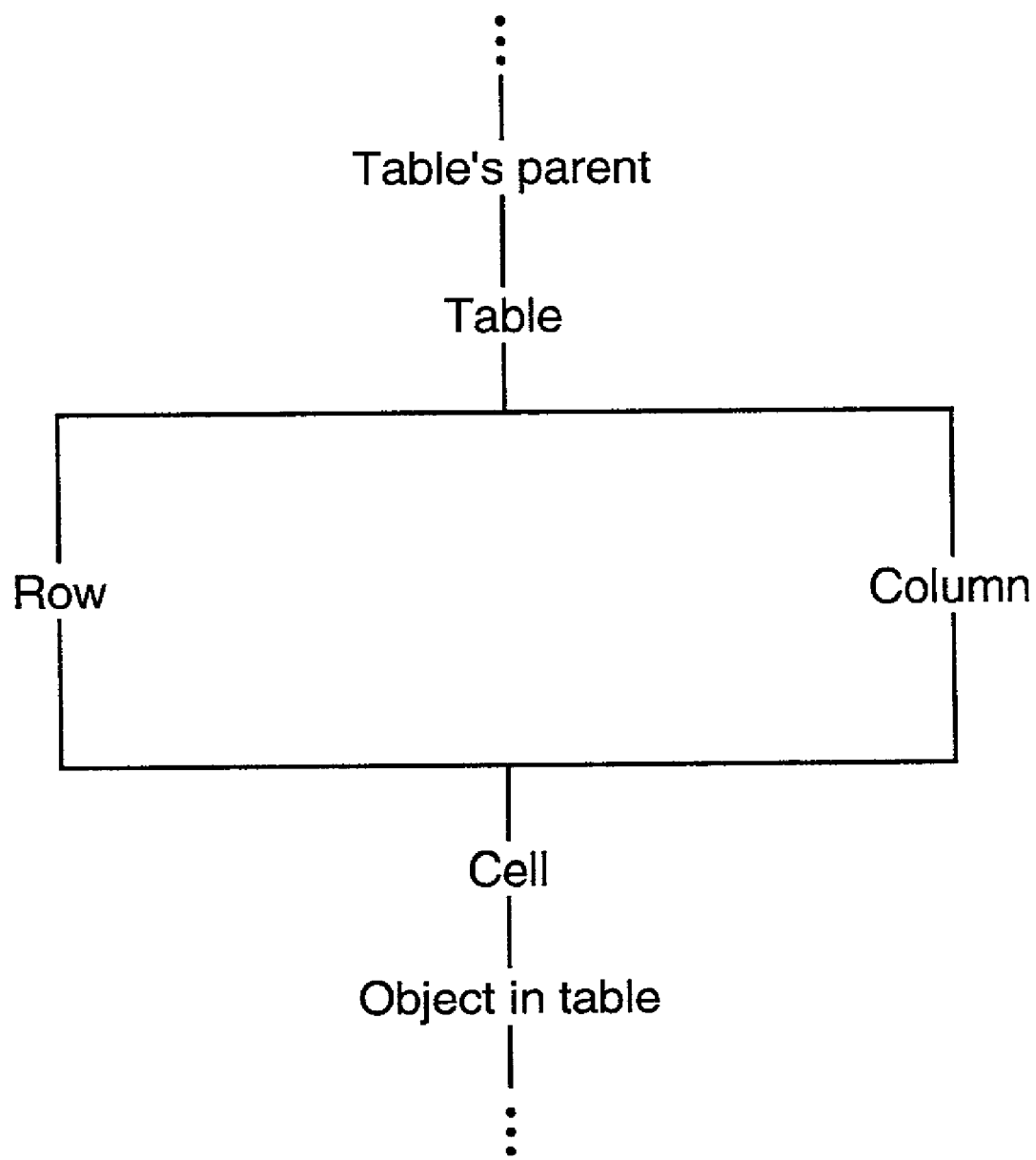
FIG. 19 illustrates relationships between objects in a graphical hierarchy that contains tables.

The option hierarchy model described above handles most of the requirements of the Curl language's graphics system, but for tables a more sophisticated model is useful. In the case of tables, it is useful to be able to attach options to entire rows or columns, as well as to a table as a whole or just to an individual table element. The Curl language's package for displaying tables includes special extensions of the methods that do option lookup and option-change notification so as to implement this sort of "branching" in the option hierarchy. Drawing the option parents above their children, the set of ancestors for an object in a table cell is illustrated in FIG. 19.

The algorithm for looking up a nonlocal option's value at an object in the table is as follows:

1. If the option is set at that object, then return the corresponding value.
2. If the option is set at the cell then return the corresponding value. (The object that represents a table cell is defined so that its type is a subclass of GraphicOptions.)
3. If the option is set either at the row or at the column, but not at both, then return the corresponding value. (The objects that represent rows and columns are defined so that their types are subclasses of GraphicOptions.)

4. If the option is set at both the row and the column, find out which value was set more recently (using the subclassing technique discussed under "Implementation of Options"), and return that corresponding value.
5. If the option is set at neither the row nor the column, then continue searching for a value at the table or one of the table's option ancestors, in the usual fashion.

This scheme has the pleasant property that after executing the following code:

```
let t:Table = {Table}
set {t.get-column 2}.background = "green"
set {t.get-row 3}.background = "blue"
``` the background of the element at position (2,3) in the table will be blue (as will the background of all other elements in row 3), while the background of all the other elements in column 2 will be green. And if we invert the order of the assignments:

```
var t:Table = {Table}
set {t.get-row 3}.background = "blue"
set {t.get-column 2}.background = "green"
``` then the situation will be the same except that the element at (2,3) will now have a green background. This structure supports a simple semantic description in which, for example, set {t.get-colunm 2}.background="green"

can be interpreted as just meaning, "color all the cells in column 2 green" no matter what their color was before.

Implementation on a Computer System

Figure 20:
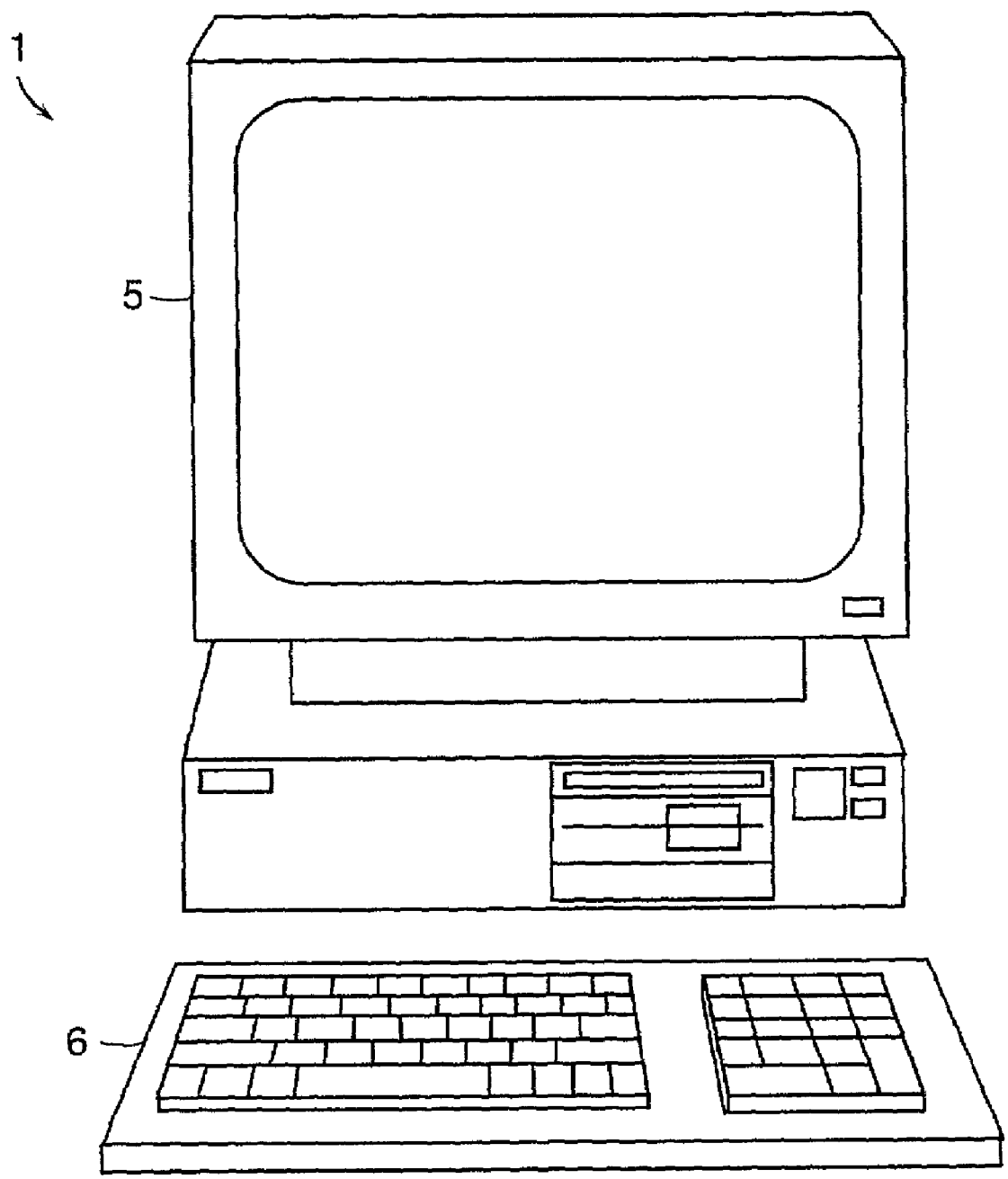
FIG. 20 illustrates a typical personal computer in which the invention may be implemented.

FIG. 20 shows an example of a computer system on which embodiments of the present invention may be implemented. As shown, Computer 1 includes a variety of peripherals, among them being: i) a display screen 5 for displaying images/video or other information to a user, ii) a keyboard 6 for inputting text and user commands. Computer 1 may be a personal computer (PC), workstation, embedded system component, handheld computer, telecommunications device or any device containing a memory and processor.

FIG. 21 shows the internal structure of Computer 1. As illustrated, Computer 1 includes mass storage 12, which comprises a computer-readable medium such as a computer hard disk and/or RAID ("redundant array of inexpensive disks"). Mass storage 12 is adapted to store applications 14, databases 15, and operating systems 16. In preferred embodiments of the invention, the operating system 16 is a windowing operating system, such as RedHat® Linux or Microsoft® Windows98, although the invention may be used with other operating systems as well. Among the applications stored in memory 12 is a programming environment 17 and source files. Programming environment 17 compiles the source files written in a language that creates the output generated by embodiments of the present invention. In the preferred embodiment of the invention, this language is the Curl™ language, developed by Curl Corporation of Cambridge, Mass. The programming language is based upon a language developed at Massachusetts Institute of Technology and presented in "Curl: A Gentle Slope Language for the Web," WorldWideWeb Journal, by M. Hostetter et al., Vol II. Issue 2, O'Reilly & Associates, Spring 1997.

Computer 1 also includes display interface 19, keyboard interface 21, computer bus 31, RAM 27, and processor 29. Processor 29 preferably comprises a Pentium II® (Intel Corporation, Santa Clara, Calif.) microprocessor or the like for executing applications, such those noted above, out of RAM 27. Such applications, including the programming environment and/or embodiments of the present invention 17, may be stored in memory 12 (as above). Processor 29 accesses applications (or other data) stored in memory 12 via bus 31.

Application execution and other tasks of Computer 1 may be initiated using keyboard 6 commands which are transmitted to processor 29 via keyboard interface 21. Output results from applications running on Computer 1 may be processed by display interface 19 and then displayed to a user on display 5. To this end, display interface 19 preferably comprises a display processor for forming images based on image data provided by processor 29 over computer bus 31, and for outputting those images to display 5.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of processing data comprising:
  compiling a definition of a class which supports options, each option defined in the class or through a class inheritance hierarchy, and each option having an option value associated therewith,
  wherein in instances of the class the options are referenceable without allocation of memory space for the associated option values when instances of the class are created, and
  wherein compiling the definition comprises
    generating a class describing data structure, wherein the class describing data structure is associated with at least one option describing data structure, the at least one option describing data structure comprising a type description corresponding to each option defined in the class or through the class inheritance hierarchy; and
  compiling an operation on a value associated with a selected option in an instance of the class,
  wherein compiling the operation comprises searching the at least one option describing data structure associated with the class describing data structure to locate the type description corresponding to the selected option, and using the type description to type check the operation.

2. A method as claimed in claim 1 wherein the at least one option describing data structure identifies change handler code that is executed when an option value changes.

3. A method as claimed in claim 2 wherein the selected option is defined in a plurality of classes within a class inheritance hierarchy, with each of the plurality of classes identifying change handler code corresponding to the selected option, and further comprising, when the option value associated with the selected option changes, executing the change handler code identified by each of the plurality of classes in which the selected option is defined.

4. A method as claimed in claim 2 wherein the selected option is defined in a plurality of classes within a class inheritance hierarchy, with a subset of the plurality of classes having change handler code corresponding to the selected option, and further comprising, when the option value associated with the selected option changes, executing the change handler code from the subset of the plurality of classes.

5. A method as claimed in claim 1 wherein the at least one option describing data structure further comprises a default value for each option defined in the class or through the class inheritance hierarchy, the method further comprising, in a get operation to a selected option in an instance of the class, when the option value associated with the selected option has been set, getting the set option value and, when the option value associated with the selected option has not been set, getting the default value.

6. A method as claimed in claim 1, wherein the at least one option describing data structure comprises an option binding object for each option defined in the class or through the class inheritance hierarchy, further comprising:

notifying a selected instance of the class of a change in an option value through a change handler identified by the option binding object, the option binding object being located by first searching a mapping data structure for a previously computed mapping to the option binding object and, if no mapping was previously computed, by then computing the mapping to the option binding object and storing the mapping in the mapping data structure.

7. A method as claimed in claim 1 wherein the instance of the class is associated with a listing data structure, the listing data structure having option items comprising option values, the option items being arranged in a linked list.

8. A method as claimed in claim 1 wherein a nonlocal option value applies to other instances of the class in a nonlocal option hierarchy.

9. A method as claimed in claim 8 wherein the nonlocal option hierarchy is a graphical hierarchy.

10. A method as claimed in claim 1 wherein the class supports fields, each field having a field value associated therewith, wherein instances of the class are allocated memory space for the associated field value when the instance of the class is created.

11. A method as claimed in claim 1, wherein the operation is to set the option value to a second value, the second value having a declared type, and wherein type checking the operation comprises checking the declared type against the type description corresponding to the selected option.

12. A method as claimed in claim 1 wherein the operation is one that is to be performed using a selected option value resulting from a get operation, and wherein type checking the operation comprises checking the legality of the operation to be performed using the selected option value.

13. The method of claim 1, wherein the allocation of memory space for an option value in an instance of the class occurs when the option value is set.

14. The method of claim 1, wherein the definition of the class also supports fields, each field having a field value associated therewith, wherein, in instances of the class, memory space is allocated for the associated field values when the instance is created, and wherein the method further comprises
generating a field describing data structure, the field describing data structure comprising a type description corresponding to each field supported by the class; and
compiling an operation on a field value in an instance of the class, wherein compiling the operation on the associated field value comprises locating the type description corresponding to the field and using the type description to type check the operation.

15. A method as claimed in claim 1 wherein the at least one option describing data structure further comprises a name corresponding to each option defined in the class or through the class inheritance heirarchy, and wherein compiling the operation further comprises using the name to locate the type description corresponding to the selected option.

16. A method as claimed in claim 15 wherein the at least one option describing data structure comprises an option binding object for each option defined in the class or through the class inheritance hierarchy, wherein each option binding object comprises the name and the type description for the corresponding option.

17. A method as claimed in claim 1 wherein the class describing data structure has a reference to the at least one option describing data structure, and wherein compiling the operation comprises searching the at least one option describing data structure referenced by the class describing data structure to locate the type description corresponding to the selected option, and using the type description to type check the operation.

18. A method as claimed in claim 1 wherein an instance of the first class is associated with a first listing data structure, the first listing data structure having option items comprising option values, the option items being arranged in a first form, and wherein the method further comprises compiling a definition of a second class which supports options, each option having an option value associated therewith, and wherein an instance of the second class is associated with a second listing data structure, the second listing data structure having option items comprising option values, the option items being arranged in a second form, and wherein compiling the operation on a value associated with a selected option in an instance of the first class comprises encoding the operation as a method call to an instance of the first class without regard to form of the listing data structure supported by the first or second class, and wherein compiling the operation on a value associated with a selected option in an instance of the second class comprises encoding the operation as a method call to an instance of the second class without regard to form of the listing data structure supported by the first or second class.

19. A method as claimed in claim 18 wherein the first form is a linked list and the second form is a hash table.

20. A method as claimed in claim 1 wherein compiling the operation further comprises translating the operation into a method call to the instance of the class.

21. A data processing system comprising:
a memory; and
a processor coupled to the memory and configured
for compiling a definition of a class which supports options, each option defined in the class or through a class inheritance hierarchy, and each option having option values associated therewith wherein in instances of the class the options are referenceable without allocation of memory space for the associated option values when instances of the class are created, and wherein compiling the definition comprises generating a class describing data structure, wherein the class describing data structure is associated with at least one option describing data structure, the at least one option describing data structure comprising a type description corresponding to each option defined in the class or through the class inheritance hierarchy, and for compiler which, when for compiling an operation on value associated with a selected option in an instance of the class, wherein compiling the operation comprises searching the option describing data structure associated with the class describing data structure to locate the type description corresponding to the selected option, and using the type description to type check the operation.

22. A system as claimed in claim 21 wherein the at least one option describing data structure identifies change handler code that is executed when an option value changes.

23. A system as claimed in claim 22 wherein the selected option is defined in a plurality of classes within a class inheritance hierarchy, with each of the plurality of classes identifying change handler code corresponding to the selected option, and wherein when the option value associated with the selected option changes, executing the change handler code identified by each of the plurality of classes in which the selected option is defined.

24. A system as claimed in claim 21 wherein the at least one option describing data structure further comprises a default value corresponding to each option defined in the class or through the class inheritance hierarchy, and wherein the default value is obtained when no option value has been set for the corresponding option.

25. A system as claimed in claim 21, wherein the at least one option describing data structure comprises an option binding object associated with each option defined in the class or through the class inheritance hierarchy, each option having an option name, further comprising a mapping data structure which maps selected option name and class to the associated option binding object, wherein the associated option binding object identifies change handlers that notify instances of the class of a change in the selected option value.

26. A system as claimed in claim 21 wherein the instance of the class is associated with a listing data structure, the listing data structure comprising a linked list of option items having option values.

27. A system as claimed in claim 21 wherein a nonlocal option value applies to other instances of the class in a nonlocal option hierarchy.

28. A system as claimed in claim 27 wherein the nonlocal option hierarchy is a graphical hierarchy.

29. A system as claimed in claim 21 wherein the class supports fields, each field having a field value associated therewith, wherein instances of the class are allocated memory space for the associated field value when the instance of the class is created.

30. A system as claimed in claim 21 wherein the operation is to set an option value to a second value, the second value having a declared type, and wherein type checking the operation comprises checking the declared type against the type description corresponding to the selected option.

31. A system as claimed in claim 21 wherein the operation is one that is to be performed using a selected option value resulting from a get operation, and wherein type checking the operation comprises checking the legality of the operation to be performed using the selected option.

32. A system as claimed in claim 21 wherein the options in an instance of the first class are associated with a first listing data structure, the first listing data structure having option items comprising option values, the option items associated with the first listing data structure being arranged in a first form, and wherein the processor is further configured for compiling a definition of a second class which supports options, each option having an option value associated therewith, and wherein the options in an instance of the second class are associated with a second listing data structure, the second listing data structure having option items comprising option values, the option items associated with the second listing data structure being arranged in a second form, and for compiling the operation on a value associated with a selected option in an instance of the first class further comprises encoding the operation as a method call to an instance of the first class without regard to form of the listing data structure supported by the first or second class.

33. A data processing system comprising:

means for compiling a definition of a class which supports options, each option defined in the class or through a class inheritance hierarchy, and each option having an option value associated therewith, wherein in instances of the class, the options are referenceable without allocation of memory space for the associated option values when instances of the class are created, and wherein compiling the definition comprises generating a class describing data structure, wherein the class describing data structure is associated with at least one option describing data structure, the at least one option describing data structure comprising a type description corresponding to each option defined in the class or through the class inheritance hierarchy; and means for compiling an operation on value associated with a selected option in an instance of the class, wherein compiling the operation comprises searching the at least one option describing data structure associated with the class describing data structure to locate the type description corresponding to the selected option, and using the type description to type check the operation.

34. A computer program product comprising:

a computer usable storage medium for storing data; and a set of computer program instructions embodied on the computer usable storage medium, including instructions to compile a definition of a class which supports options, each option defined in the class or through a class inheritance hierarchy, and each option having an option value associated therewith, wherein in instances of the class, to the options are referenceable without allocation of memory space for the associated option value when instances of the class are created, and wherein compiling the definition comprises generating a class describing data structure, wherein the class describing data structure is associated with at least one option describing data structure, the at least one option describing data structure comprising a type description corresponding to each option defined in the class or through the class inheritance hierarchy; and compile an operation on a value associated with a selected option in an instance of the class, wherein compiling the operation comprises searching the at least one option describing data structure associated with the class describing data structure to locate the type description corresponding to the selected option, and using the type description to type check the operation.

* * * * *

UNITED STATES PATENT AND TRADEMARK OFFICE
CERTIFICATE OF CORRECTION

PATENT NO. : 7,373,639 B2
APPLICATION NO. : 09/759697
DATED : May 13, 2008
INVENTOR(S) : Robert H. Halstead, Jr. et al.

It is certified that error appears in the above-identified patent and that said Letters Patent is hereby corrected as shown below:

Claim 14, column 23, line 65, "wherein, in" should read --wherein in--.

Claim 15, column 24, line 13, "heirarchy" should read --hierarchy--.

Claim 21, column 24, line 67, "therewith" should read --therewith,--.

Claim 21, column 25, line 3, "values" should read --value--.

Claim 21, column 25, line 14, delete "for compiler which, when".

Claim 21, column 25, line 15, "on value" should read --on a value--.

Claim 25, column 25, line 44, "maps selected" should read --maps a selected--.

Claim 33, column 26, line 33, "class, the" should read --class the--.

Claim 33, column 26, lines 43-44, "on value" should read --on a value--.

Claim 34, column 26, line 61, "class, to the" should read --class the--

Signed and Sealed this

Twenty-ninth Day of July, 2008

JON W. DUDAS
*Director of the United States Patent and Trademark Office*